United States Patent
Sears et al.

(10) Patent No.: US 11,741,864 B2
(45) Date of Patent: Aug. 29, 2023

(54) HEADSET FOR VIRTUAL REALITY APPLICATIONS WITH VARIABLE FIELD OF VIEW AND RESOLUTION

(71) Applicant: Meta Platforms Technologies, LLC, Menlo Park, CA (US)

(72) Inventors: Jasmine Soria Sears, Kirkland, WA (US); Afsoon Jamali, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/721,079

(22) Filed: Apr. 14, 2022

(65) Prior Publication Data

US 2022/0398953 A1   Dec. 15, 2022

Related U.S. Application Data

(60) Provisional application No. 63/210,402, filed on Jun. 14, 2021.

(51) Int. Cl.
*G09G 3/02* (2006.01)
*G09G 3/00* (2006.01)
(Continued)

(52) U.S. Cl.
CPC .......... *G09G 3/002* (2013.01); *G02B 5/3016* (2013.01); *G02B 27/286* (2013.01); *G06F 1/163* (2013.01);
(Continued)

(58) Field of Classification Search
None
See application file for complete search history.

(56) References Cited

U.S. PATENT DOCUMENTS 7,728,949 B2   6/2010 Clarke et al.
10,948,801 B1   3/2021 Lu et al.
(Continued)

FOREIGN PATENT DOCUMENTS

WO   2021061381 A1   4/2021

OTHER PUBLICATIONS

Lee Y-H., et al., "Recent Progress in Pancharatnam-Berry Phase Optical Elements and The Applications for Virtual/Augmented Realities," Optical Data Processing and Storage, 2017, vol. 3, pp. 79-88.

(Continued)

*Primary Examiner* — Ifedayo B Iluyomade
(74) *Attorney, Agent, or Firm* — McDermott Will & Emery LLP

(57) ABSTRACT

A device includes a display including multiple pixels, each pixel having an optical emitter to provide at least one light beam from an image. The device also includes an optical element to relay light beams from the display to a viewer through an eyebox, the eyebox limiting an area that includes a pupil of the viewer and a varifocal assembly to direct, through the eyebox, light beams having a first and second mutually orthogonal polarization states, according to a desired mode of operation of the device, and associated with a first and second field of view of the image in a focused mode of operation of the device, and an immersive mode of operation of the device, respectively. A memory storing instructions and a processor to execute the instructions to cause the device to perform a method for adjusting between the immersive mode and the focused mode are also provided.

18 Claims, 21 Drawing Sheets

(51) Int. Cl.
*G02B 27/28* (2006.01)
*G02B 5/30* (2006.01)
*G06F 1/16* (2006.01)
*G06F 3/01* (2006.01)

(52) U.S. Cl.
CPC ......... *G06F 3/013* (2013.01); *G09G 2320/08* (2013.01); *G09G 2340/045* (2013.01); *G09G 2340/0407* (2013.01); *G09G 2354/00* (2013.01)

(56) References Cited

U.S. PATENT DOCUMENTS

| | | | |
|---|---|---|---|
| 2018/0052501 A1* | 2/2018 | Jones, Jr. | ............... G06F 3/013 |
| 2019/0265514 A1 | 8/2019 | Richards et al. | |
| 2019/0285891 A1 | 9/2019 | Lam et al. | |
| 2020/0081315 A1 | 3/2020 | Jamali et al. | |
| 2021/0088782 A1* | 3/2021 | Zhao | ................. G02B 27/0068 |

OTHER PUBLICATIONS

Li L., et al., "Near-Diffraction-Limited and Low-Haze Electro-Optical Tunable Liquid Crystal Lens with Floating Electrodes," Optical Society of America, 2013, vol. 21, No. 7, pp. 8371-8381.
Zhan T., et al., "Polarization-Independent Pancharatnam-Berry Phase Lens System," Optics Express, Dec. 24, 2018, vol. 26, No. 26, pp. 35026-35033.
EPO—International Search report and Written Opinion for International Application No. PCT/US2022/033161, dated Oct. 4, 2022, 12 pages.

* cited by examiner

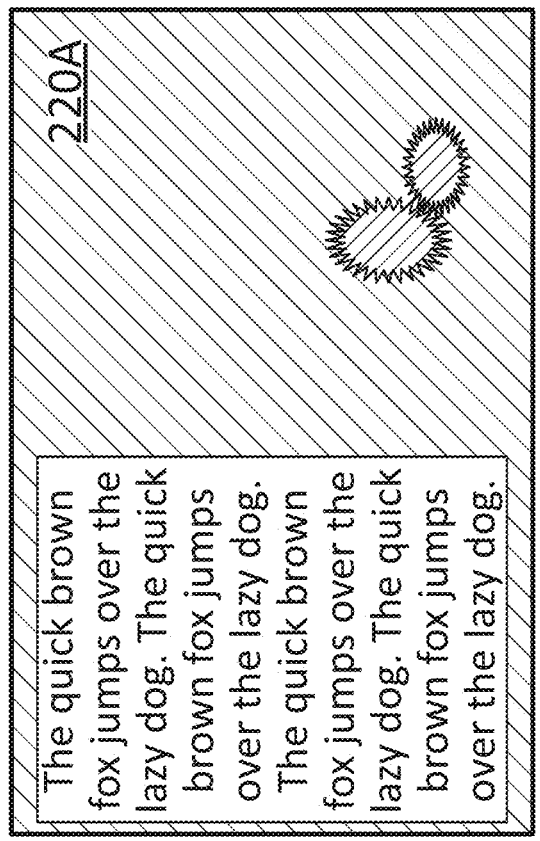
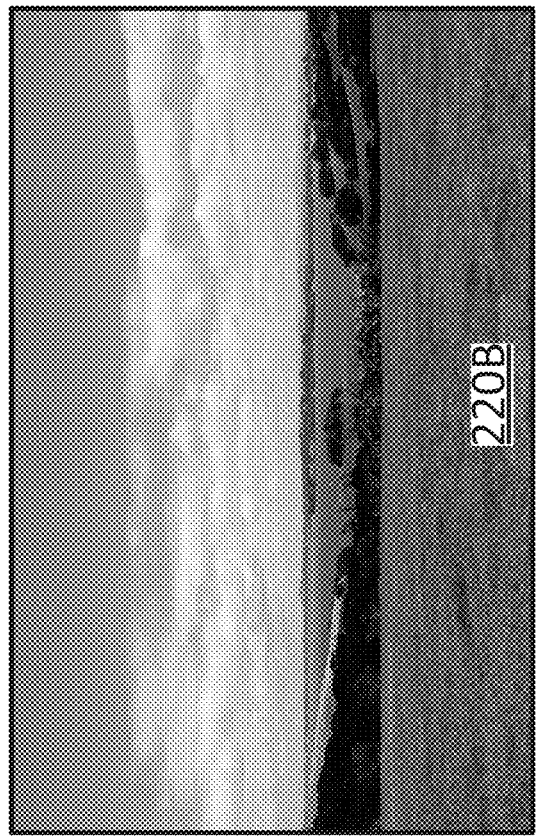
FIG. 2

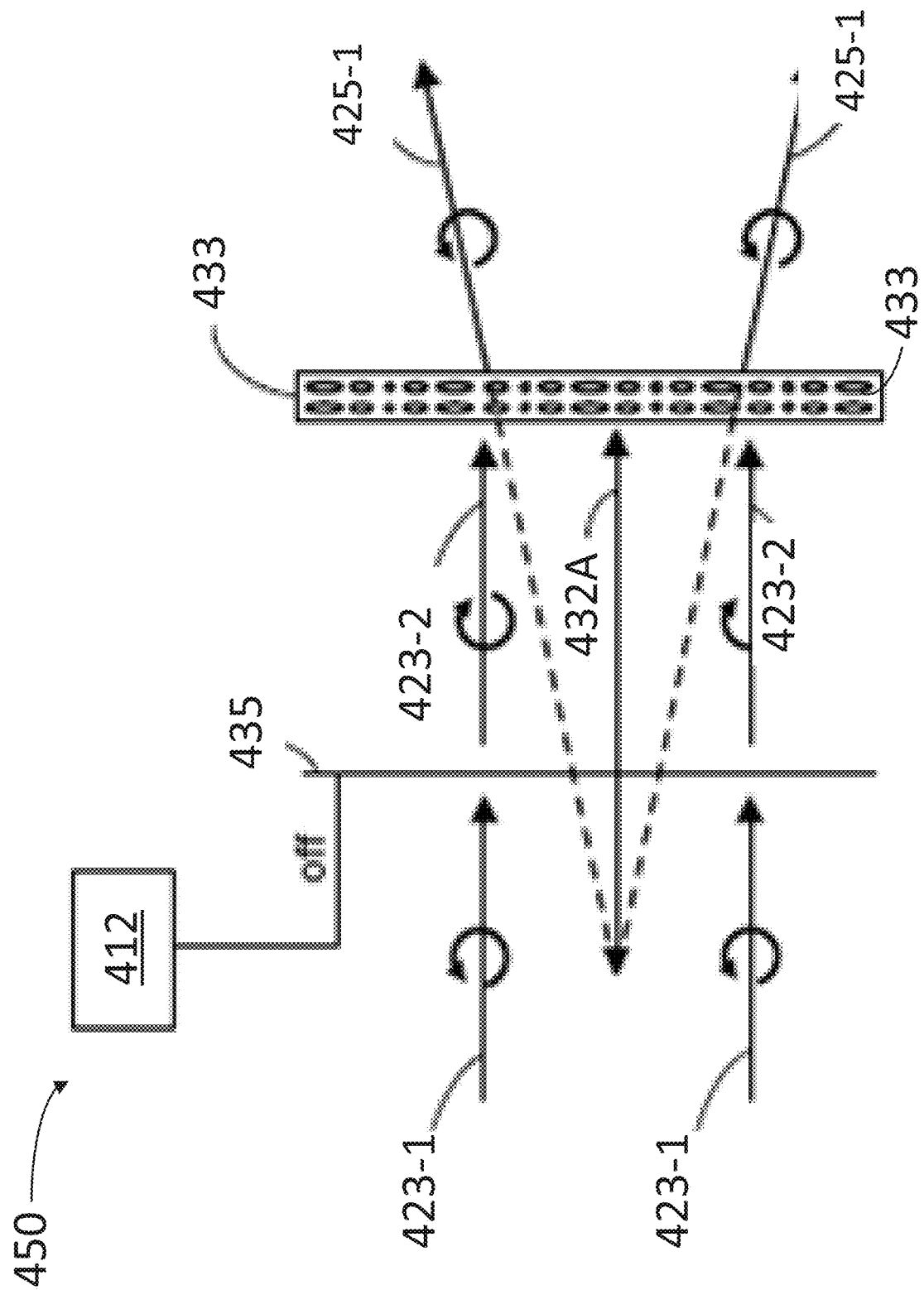

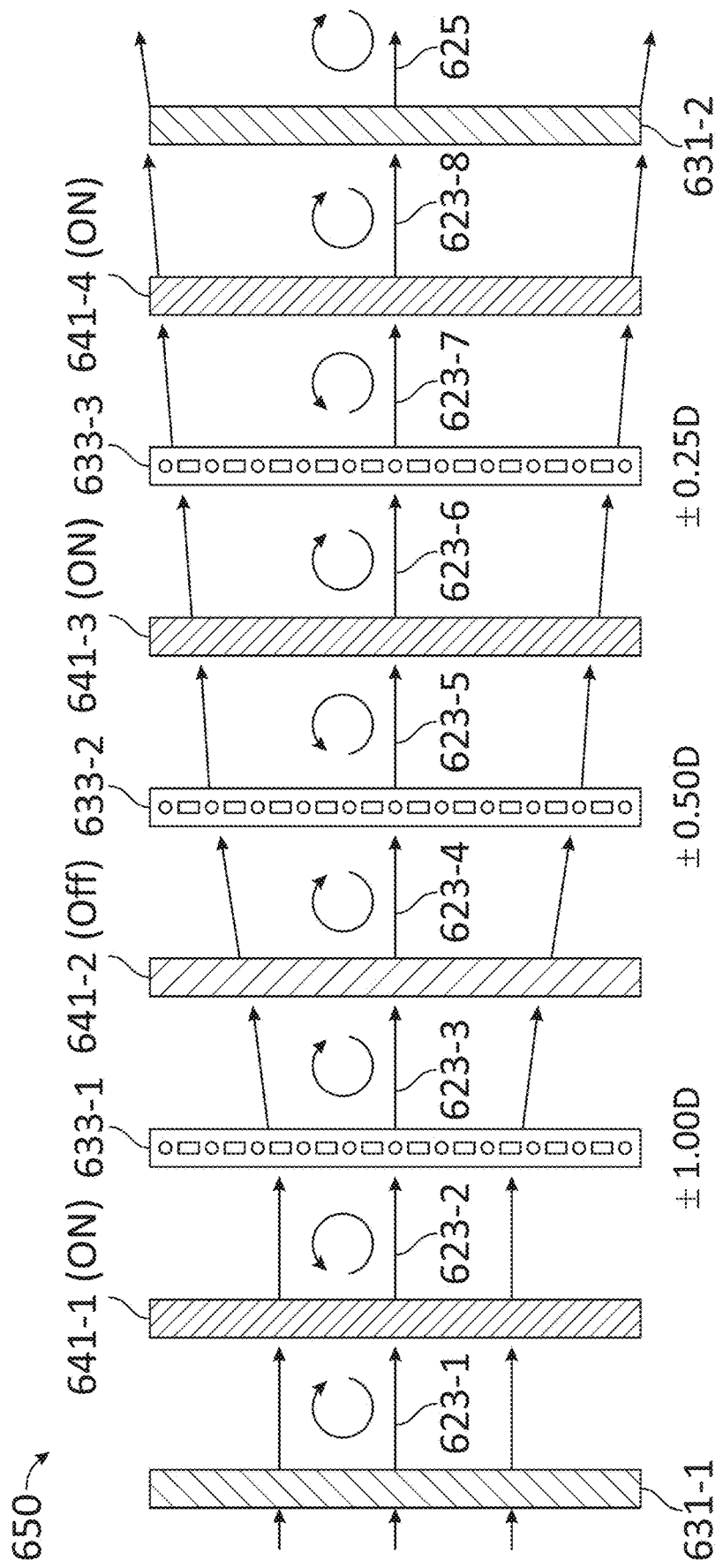

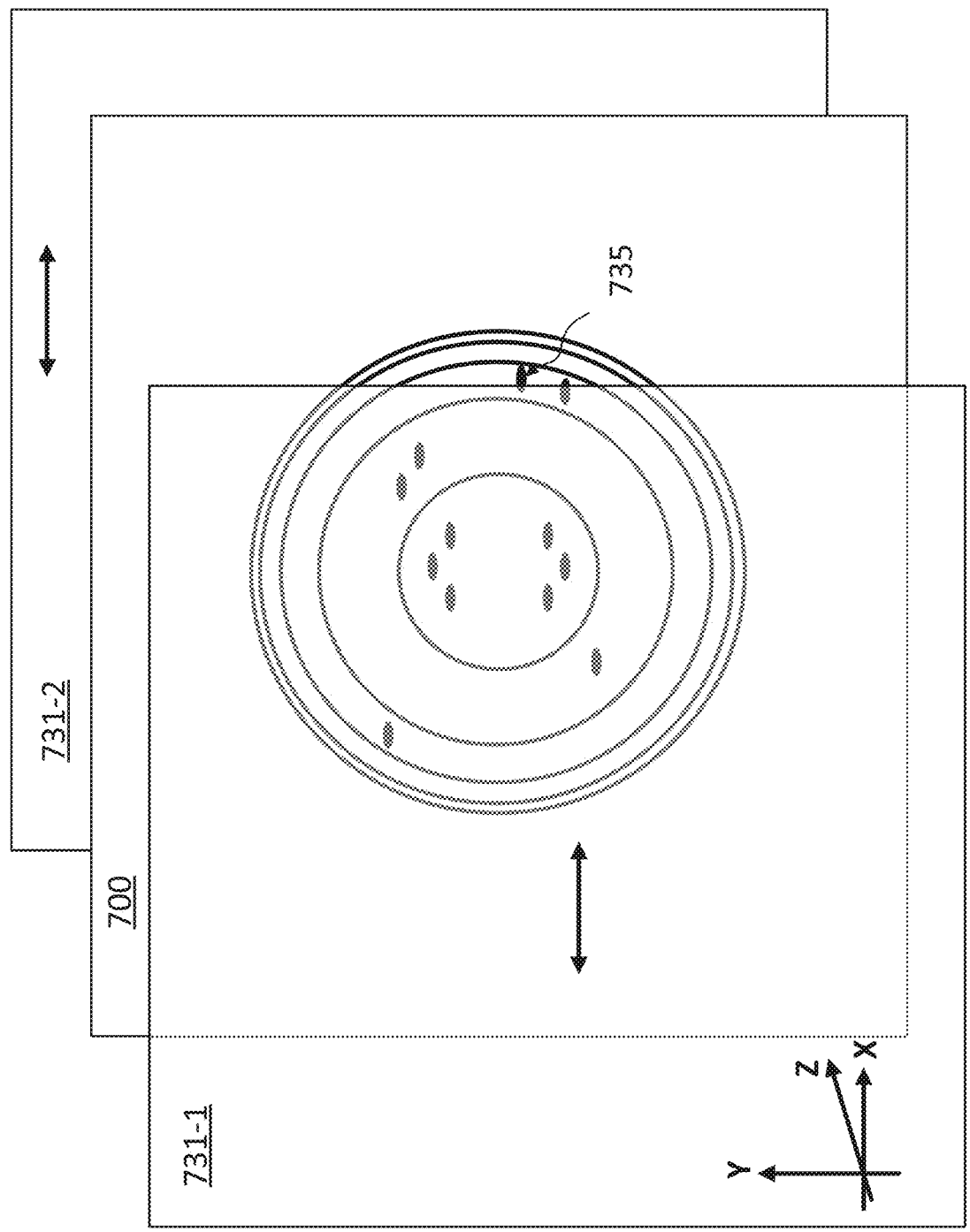

HEADSET FOR VIRTUAL REALITY APPLICATIONS WITH VARIABLE FIELD OF VIEW AND RESOLUTION

CROSS-REFERENCE TO RELATED APPLICATIONS

The present disclosure is related and claims priority under 35 USC. § 119(e) to U.S. Prov. Pat. Appln. No. 63/210,402, entitled HEADSET FOR VIRTUAL REALITY APPLICATIONS WITH VARIABLE FIELD OF VIEW AND RESOLUTION, filed on Jun. 14, 2021, to Jasmine Soria SEARS et-al., the contents of which are hereby incorporated by reference in their entirety, for all purposes.

BACKGROUND

Field

The present disclosure is related to headsets for use in virtual reality (VR) applications that can be adjusted to different modes of operation. More specifically, the present disclosure is related to headsets with variable field of view (FOV) and resolution for focused mode and immersive mode configurations.

Related Art

In the field of virtual reality headsets, when a viewer decides to change the field of view of a scene, the system loses resolution and brightness as the pixels in the image adjust the display to the desired optical configuration. In some instances, as the field of view is reduced when the user tries to focus on a detailed aspect of a scene, the resolution is lost and the brightness of the screen is diminished, creating undesirable artifacts for the image rendition. The opposite effect occurs when the viewer wants to zoom out in a scene to increase the field of view (e.g., a landscape), the higher pixel density per degree of angular view produces an overly bright scene that, at best, consumes more energy than desirable for the image rendition. Accordingly, typical immersive virtual reality systems compromise resolution and image quality during a transition between a high FOV application and a low FOV application.

BRIEF DESCRIPTION OF THE DRAWINGS

FIG. 2 illustrates display images in an immersive mode and in a focused mode of a headset for VR applications, according to some embodiments.

FIGS. 4A-4B illustrate optical properties of a varifocal assembly, according to some embodiments.

FIG. 6 illustrates a varifocal assembly to provide a variable FOV and resolution in a VR device, according to some embodiments.

FIGS. 7A-7F illustrate a segmented phase profile, liquid crystal (SPP-LC) lens for use in a varifocal assembly, according to some embodiments.

Figure 1A:
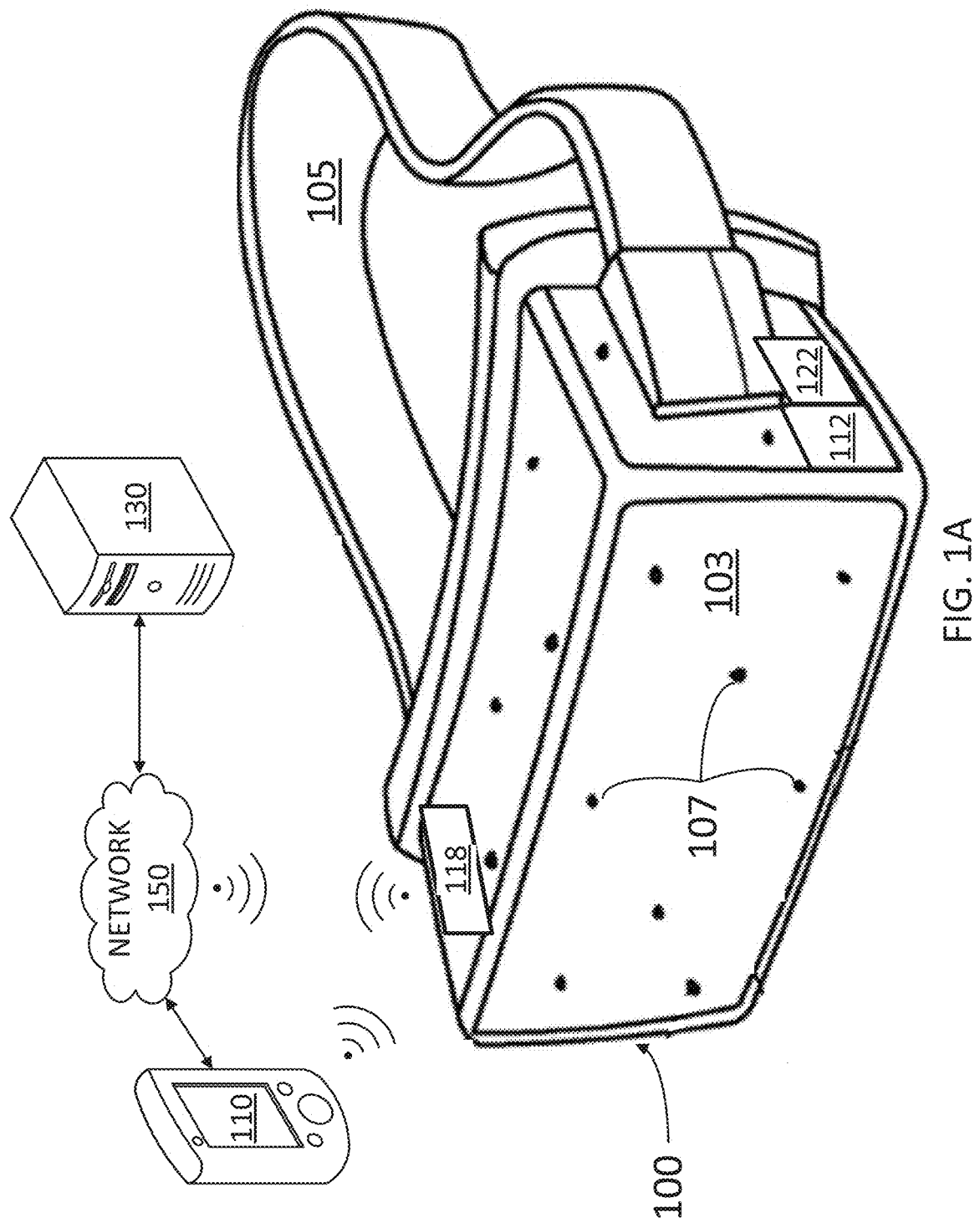
FIGS. 1A-1B illustrate a headset with a varifocal array configured for variable FOV and resolution in VR applications, according to some embodiments.

In the figures, elements having the same or similar label number share the same or similar features, unless stated explicitly otherwise.

SUMMARY

In a first embodiment, a device for virtual reality applications with variable field of view and resolution includes a display including multiple pixels, each pixel having an optical emitter to provide at least one light beam from an image. The device also includes an optical element configured to relay multiple light beams from the display to a viewer through an eyebox, the eyebox limiting an area that includes a pupil of the viewer, and a varifocal assembly configured to direct, through the eyebox, one of a first group of light beams having a first polarization state and one of a second group of light beams having a second polarization state, according to a desired mode of operation of the device. The first group of light beams forms a first field of view of the image in a focused mode of operation of the device, and the second group of light beams forms a second field of view of the image in an immersive mode of operation of the device.

In a second embodiment, a method for adjusting a field of view and resolution in a virtual reality application includes determining a desired mode of operation for a headset configured to provide an image to a viewer. The method also includes generating, with a display including multiple optical emitters, wherein each optical emitter forms a pixel in the display, multiple light beams forming the image, and relaying the light beams from the display to the viewer through an eyebox that delimits an area enclosing a pupil of the viewer. The method also includes selecting, via a varifocal assembly, one of a first group of light beams or a second group of light beams to be directed through the eyebox, based on the desired mode of operation, wherein the first group of light beams forms a first field of view of the image in a focused mode of operation, and the second group of light beams forms a second field of view of the image in an immersive mode of operation.

In a third embodiment, a system includes a memory storing instructions and a processor configured to execute the instructions to cause the system to perform a method for adjusting a field of view and resolution in a virtual reality application. The method includes determining a desired mode of operation for a headset configured to provide an image to a viewer. The method also includes generating, with a display including multiple optical emitters, wherein each optical emitter forms a pixel in the display, multiple light beams forming the image, and relaying the light beams from the display to the viewer through an eyebox that delimits an area enclosing a pupil of the viewer. The method also includes selecting, via a varifocal assembly, one of a first group of light beams or a second group of light beams to be directed through the eyebox, based on the desired mode of operation, wherein the first group of light beams forms a first field of view of the image in a focused mode of operation, and the second group of light beams forms a second field of view of the image in an immersive mode of operation.

In yet another embodiment, a system includes a first means for storing instructions and a second means to execute the instructions to cause the system to perform operations. The operations include determining a desired mode of operation for a headset configured to provide an image to a viewer. The operations also include generating, with a display including multiple optical emitters, wherein each optical emitter forms a pixel in the display, multiple light beams forming the image, and relaying the light beams from the display to the viewer through an eyebox that delimits an area enclosing a pupil of the viewer. The operations also include selecting, via a varifocal assembly, one of a first group of light beams or a second group of light beams to be directed through the eyebox, based on the desired mode of operation, wherein the first group of light beams forms a first field of view of the image in a focused mode of operation, and the second group of light beams forms a second field of view of the image in an immersive mode of operation.

These and other embodiments will be clear based on the following disclosure.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure. Embodiments as disclosed herein should be considered within the scope of features and other embodiments illustrated in the figures herein, as follows.

In the field of virtual reality headsets, different use-cases have different specifications and desirable attributes. For example, in gaming and other immersive media applications, a large FOV is desirable to enhance the user experience. On the other hand, productivity applications (e.g., a user working on a virtual workstation or desktop, or other virtual platform) desirably provide high resolution imaging to the viewer. Meeting the above specifications for all use-cases at all times would be expensive/inefficient. For example, providing high resolution imaging across a large FOV may involve displays having a large number of pixels. In addition, work involving fine detail (e.g., high resolution) is desirably performed under high-brightness conditions.

To resolve the above technical problem, embodiments as disclosed herein allow a VR headset to switch between small FOV, high resolution and large FOV, low resolution configurations depending on use-case. To achieve this, some embodiments include a reconfigurable optical assembly (e.g., a varifocal assembly) to adjust a viewed angular size of a headset display. For example, in some embodiments, the optical assembly spreads the display pixels out over a wide FOV. And in some embodiments, the optical assembly condenses the display pixels to allow for high-resolution/high-brightness view.

Figure 1B:
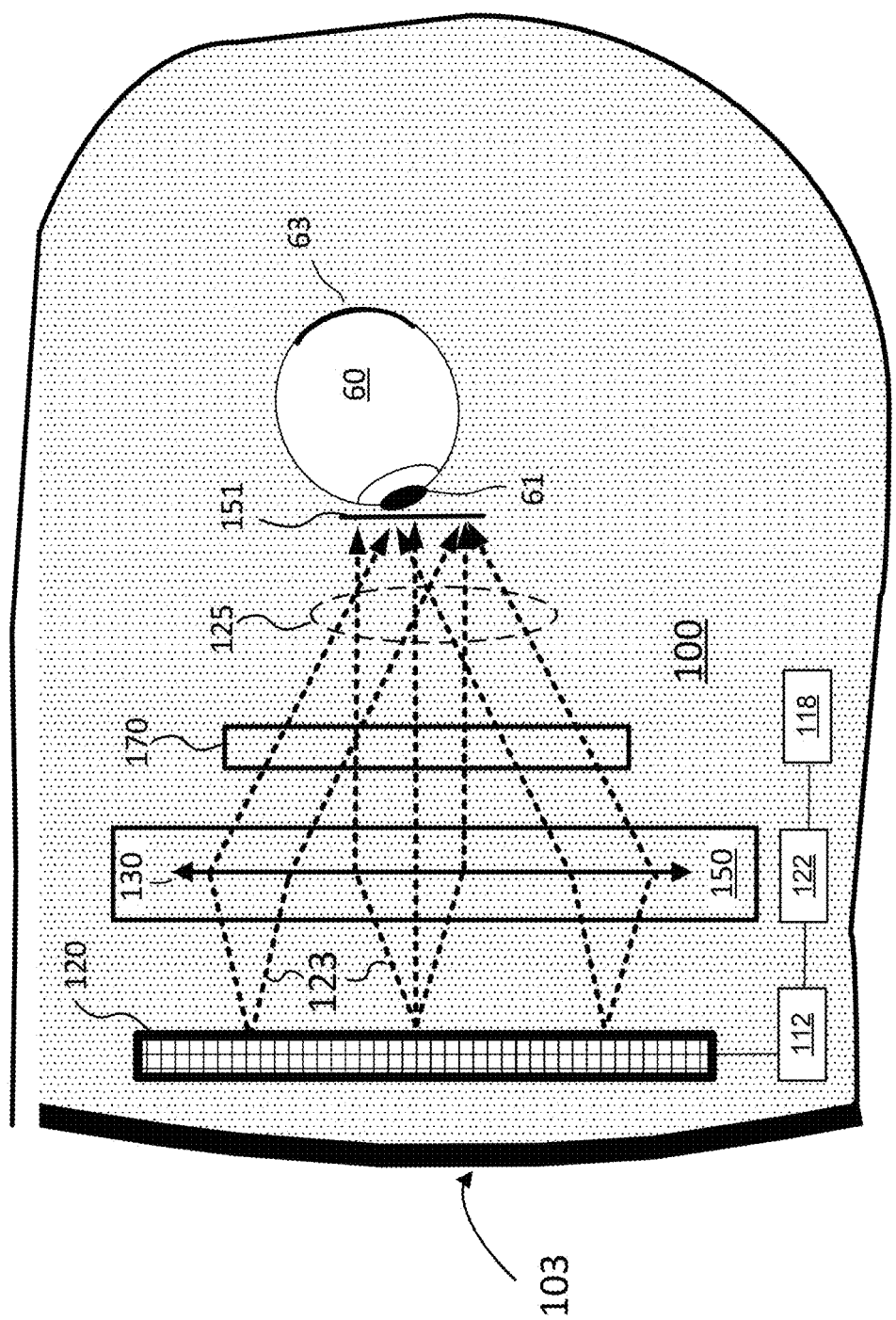

FIGS. 1A-1B illustrate a headset 100 with a varifocal array configured for variable FOV and resolution in VR applications, according to some embodiments. Headset 100 includes a visor 103, and a strap 105. Visor 103 includes and protects a display for the user, and strap 105 adjusts and keeps headset 100 tightly fit on the user's head. Locators 107 may be objects located in specific positions on visor 103 relative to one another and relative to a specific reference point on headset 100. A locator 107 may include a light emitting diode (LED), a corner cube reflector, a reflective marker, a type of light source that contrasts with an environment in which headset 100 operates, or a combination thereof.

In some embodiments, headset 100 may include a processor circuit 112 and a memory circuit 122. Memory circuit 122 may store instructions which, when executed by processor circuit 112, cause headset 100 to execute one or more steps in methods as disclosed herein. In addition, headset 100 may include a communications module 118. Communications module 118 may include radio-frequency software and hardware configured to wirelessly communicate processor 112 and memory 122 with an external network 150, and a remote server 130 or a mobile device 110 handled by the user of headset 100. Accordingly, communications module 118 may include radio antennas, transceivers, and sensors, and also digital processing circuits for signal processing according to any one of multiple wireless protocols such as Wi-Fi, Bluetooth, Near field contact (NFC), and the like. In addition, communications module 118 may also communicate with other input tools and accessories cooperating with headset 100 (e.g., handle sticks, joysticks, mouse, wireless pointers, and the like). Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

FIG. 1B illustrates a partial view of a left side view 102 of headset 100 corresponding to the left eye 60 of a user. Headset 100 may include two mirror images of left side view 102 each having the same or similar elements as illustrated in left side view 102. The choice of the left side in FIG. 1B is arbitrary, and all components therein may be present in the right side of headset 100. Headset 100 includes a display 120, which may include multiple pixels configured in a two-dimensional surface. Display 120 provides multiple light beams 123 forming an image provided to a user. A varifocal assembly 150 is configured to provide light beams 125 forming an FOV for the image through an eyebox 151. Eye 60 includes a pupil 61, to accept at least some of light beams 125, and a retina 63, where the image is projected. Eyebox 151 forms an area or volume that includes pupil 61, and may change in size, shape, and location as pupil 61 moves over different areas of interest for the user, within the projected image.

In some embodiments, varifocal assembly 150 may include one or more optical elements 130 such as diffractive elements (gratings and prisms), refractive elements (lenses), guiding elements (e.g., planar waveguides and/or fibers), and polarizing elements (e.g., polarizers, half-wave plates, quarter wave-plates, polarization rotators, Pancharatnam-Berry Phase lens—PBP—, and the like). In some embodiments, varifocal assembly 150 may include one or more passive elements combined with one or more active elements, such as a liquid crystal (LC) variable wave plate or variable polarize.

In some embodiments, headset 100 includes an eye-tracking system 170. Eye-tracking system 170 includes one or more sensors to determine a position of pupil 61 within eyebox 151. A corresponding eye-tracking system in the right side of headset 100 (not shown) performs the same operation for the pupil in the right eye. Eye-tracking system 170 then sends the information about the position of pupil 61 within eyebox 151 to processor 112. Based on the position of the two user pupils, processor 112 may determine a gaze direction, vergence, and focus of interest of the user, within the projected image. In some embodiments, memory 122 contains instructions for varifocal assembly 150 which change how the virtual image is mapped to display 120, based on the focus of interest of the user.

FIG. 2 illustrates different display images 220A and 220B (hereinafter, collectively referred to as "display images 220") in an immersive mode (220A) and in a focused mode (220B) of a headset in a VR application, according to some embodiments. In some embodiments, the display is configured to adjust a resolution of images 220 based on the desired mode of operation of the device. For example, in some embodiments, the display may increase image resolution in the focused mode of operation to take advantage of a higher angular resolution of the optical assembly in the headset device (cf. image 220B). To do this, the display may provide a finer pixel to pixel resolution of the image in the focused mode of operation. In addition, the display may reduce the brightness of each pixel emission in the focused mode of operation, as the optical assembly collects more light from each pixel when the magnification is higher (e.g., for a higher resolution). Accordingly, embodiments as disclosed herein enable a more efficient power budget management for a headset device.

Figure 3:
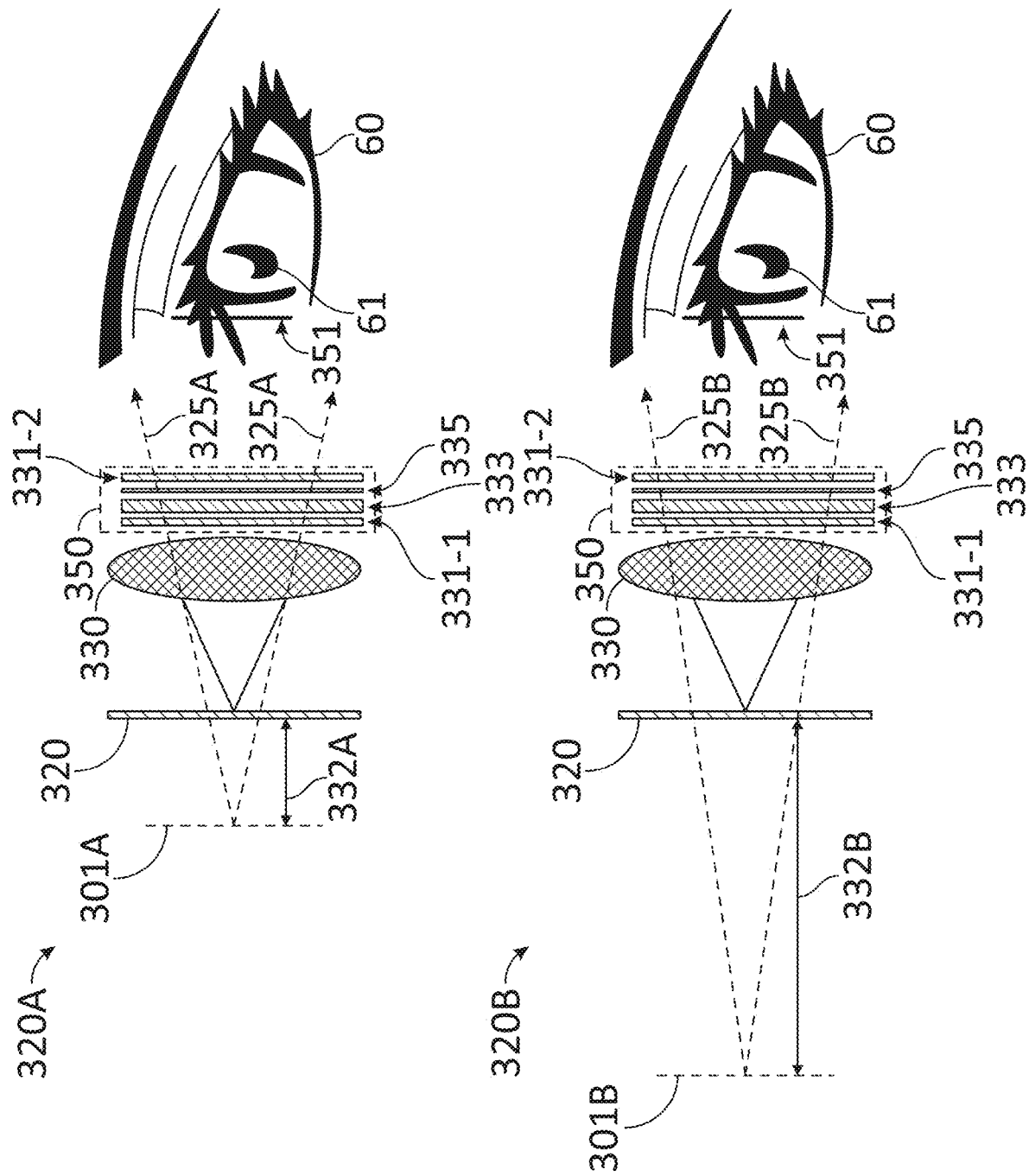
FIG. 3 illustrates a varifocal assembly in a focused mode and in an immersive mode of a headset for VR applications, according to some embodiments.

FIG. 3 illustrates a varifocal assembly 350 in a focused mode 320A and in an immersive mode 320B of a headset for VR applications (e.g., headset 100), according to some embodiments. The headset may include a display 320 having an array of pixels, each pixel having an optical emitter to provide at least one light ray from an image. The headset also includes an optical element 330 (e.g., a lens) configured to relay multiple light rays from display 320 to a viewer's eye 60 through an eyebox 351 limiting an area or volume that includes a pupil 61 of the viewer. Varifocal assembly 350 is configured to direct, through eyebox 351, light beams 325A and light beams 325B (hereinafter, collectively referred to as "light beams 325"), according to a desired mode of operation of the device. In some embodiments, light beams 325A form a first FOV of the image in a focused mode of operation of the device wherein an image plane 301A is located at a distance, 332A, from display 320. Likewise, light beams 325B form a second FOV of the image in an immersive mode of operation of the device, wherein an image plane 301B is located at a distance, 332B, from display 320. Distances 332A and 332B will be collectively referred to, hereinafter, as "image distances 332." In general, the FOV in focused mode 320A is smaller than the FOV in immersive mode 320B, and distance 320B, is greater than distance 320A. Accordingly, the optical power of the combined lens 330 and varifocal assembly 350 is greater in focused mode 320A relative to immersive mode 320B. That is, light beams 325A are bent by a steeper degree to go through the eyebox relative to light beams 325B. Accordingly, the viewer sees an image with a higher angular resolution in focused mode 320A, relative to immersive mode 320B.

In some embodiments, varifocal assembly 350 is configured to block at least one of light beams 325 according to the desired mode of operation of the headset. To do this, varifocal assembly 350 may include optical elements such as polarizers, quarter wave plates, half wave plates, and the like, configured to allow light having a first state of polarization to pass through to eyebox 351, and to block light having a second state of polarization from going through eyebox 351. In some embodiments, the first state of polarization may be orthogonal to the second state of polarization. In some embodiments, the first state of polarization and the second state of polarization may be two linear, orthogonal states of polarization. In yet other embodiments, the first state of polarization and the second state of polarization may be any one of a left circularly polarization (LCP) state and a right circularly polarized (RCP) state. The optical elements may be active optical elements such as switchable half wave plates or quarter wave plates and Pi-cells, including nematic liquid crystal layers (up to a few milliseconds, ms, response time), ferroelectric liquid crystals (a few microseconds, µs, response time or latency). Some of these active optical elements may be electrically activated via a software-controlled voltage supply, or current supply. More specifically, in some embodiments, varifocal assembly 350 may include, without limitation, an LCP polarizer 331-1, a Pancharatnam-Berry Phase (PBP) lens 333, a liquid crystal (LC) layer 335 forming a switchable half-wave plate, and an RCP polarizer 331-2.

For example, display 320 may have an optical power of −1.5 diopters (D), leading to an image distance 332 of about 0.67 m away with varifocal assembly 350 off. Turning varifocal assembly 350 on, with PBP lens 333 and LC layer 335 (off), the optical power may change to: −1.5 D−0.5 D=−2 D, shortening image distance 332 to 0.5 m away (larger magnification). When LC layer 335 is on, the optical power may shift to −1.5 D image+0.5 D=−1 D, producing an image distance 320 that is 1 m (smaller magnification). In some embodiments, lens 330 may have +Abbe# (50-65) and PBP lens 333 may have −Abbe# (−3.46). Accordingly, dispersion between the two types of lenses may cancel each other. Although the magnitude of the Abbe# may be rather different, a selected lens 330 may have strong optical power to compensate the dispersion in a weaker PBP lens 333. In some embodiments, to improve the spectral and angular performance, a dispersion compensation system as disclosed herein includes polarizers and other optical elements such as thin-film filters, and the like.

Figure 4B:
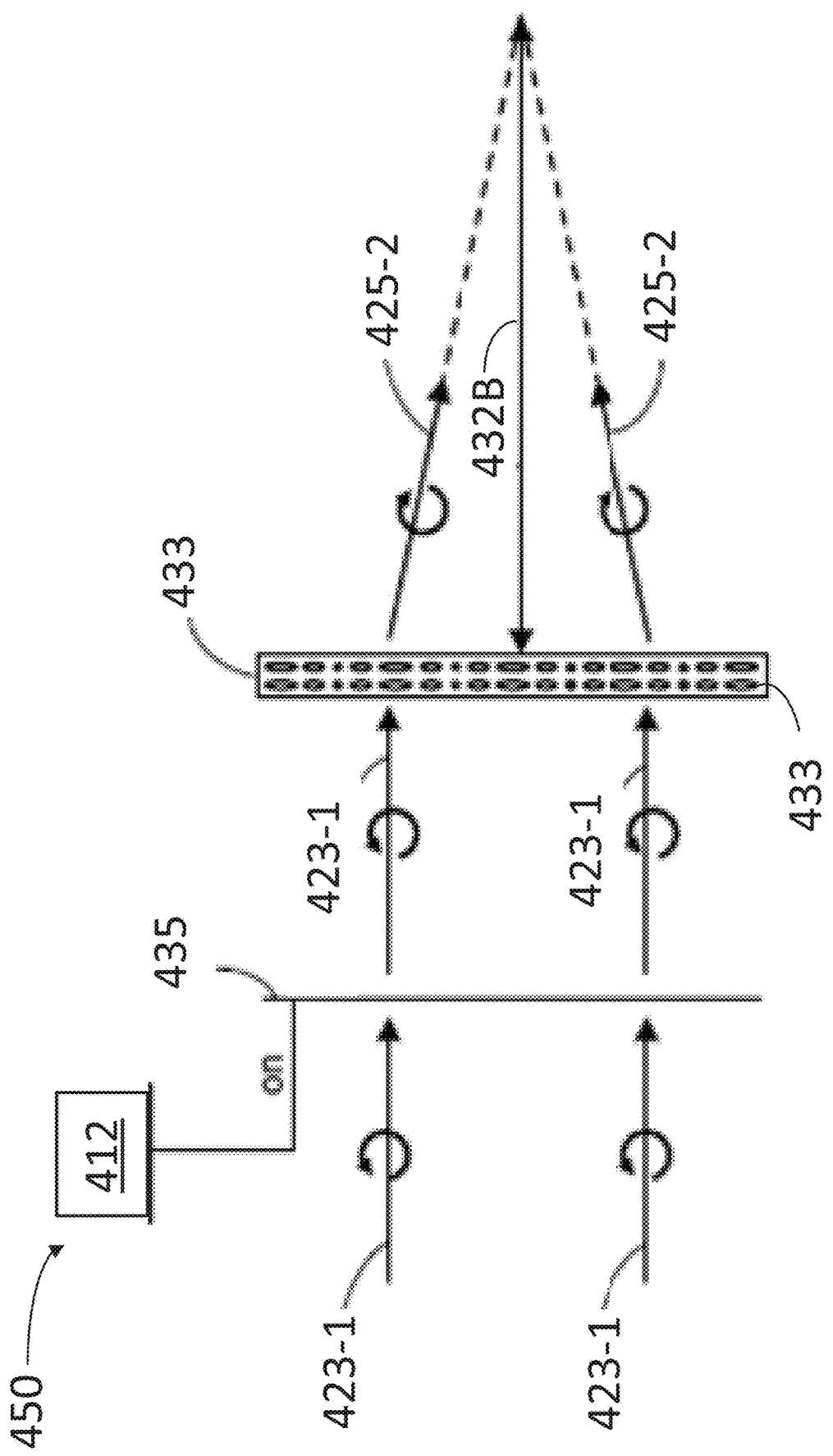

FIGS. 4A and 4B illustrate optical properties of a varifocal assembly 450, according to some embodiments. Varifocal assembly 450 may include a switchable optical element 435 and a polarization sensitive hologram (PSH) lens 433. Switchable optical element 435 may be configured to convert light beams 423-1 having a first polarization state (e.g., LCP or RCP) into light beams 423-2 having the second polarization state (e.g., RCP or LCP, respectively) when de-activated by a controller 412, and to transmit, without changing their polarization state, light beams 423-1 when activated ("on"). In some embodiments, switchable optical element 435 may include a first polarizer to select one of a first group of light rays 423-1 or a second group of light rays 423-2 before PSH lens 433, a second polarizer, and a switchable retarder disposed between the first polarizer and the second polarizer. Hereinafter, light beams 423-1 and 423-2 will be collectively referred to as "light beams 423."

PSH lens 433 may be configured to direct, through an eyebox, light beams 425 having a first polarization state (e.g., LCP) or a second polarization state (e.g., RCP), according to a desired mode of operation of the device. For example, LCP light beams 425-2 form a first field of view of the image in a focused mode of operation of the device (FIG. 4B), and light beams 425-1 form a second field of view of the image in an immersive mode of operation of the device (FIG. 4A). The specific use of RCP or LCP light for focused or immersive mode of operation is not limiting and any choice can be used, wherein the first polarization state is orthogonal to the second polarization state.

FIG. 4A illustrates light rays 423-1 having an LCP polarization state, and switchable optical element 435, in a first state (e.g., 'off'), receives incident LCP light beams 423-1 and converts them into RCP light beams 423-2. PSH lens 433 receives RCP light beams 423-2 and converts them into diverging LCP light beams 425. In some embodiments, when RCP light beams 423-1 are substantially collimated, diverging LCP light beams 425-1 form a virtual focal point located at a selected focal distance 432A from PSH lens 433. Accordingly, by selecting LCP light beams 423-1 from the display and allowing LCP light beams 425-1 to proceed (e.g., to the eyebox or another optical element), varifocal assembly 450 may increase the FOV of light beams 423-1 for the viewer.

FIG. 4B illustrates switchable optical element 435 in a second state (e.g., 'on'), that receives and transmits incident LCP light beams 423-1 onto PSH lens 433. PSH lens 433 converts LCP light beams 423-1 into converging RCP light beams 425-2. In some embodiments, when LCP light beams 423-1 are substantially collimated, converging LCP light beams 425-2 are focused by PSH lens 433 to a focal point located at a focal distance 432B from PSH lens 433. Thus, by selecting RCP light beams 423-2 from the display and allowing RCP light beams 425-2 to proceed, varifocal assembly 450 may reduce the FOV of the light rays through the eyebox for the viewer.

Figure 5:
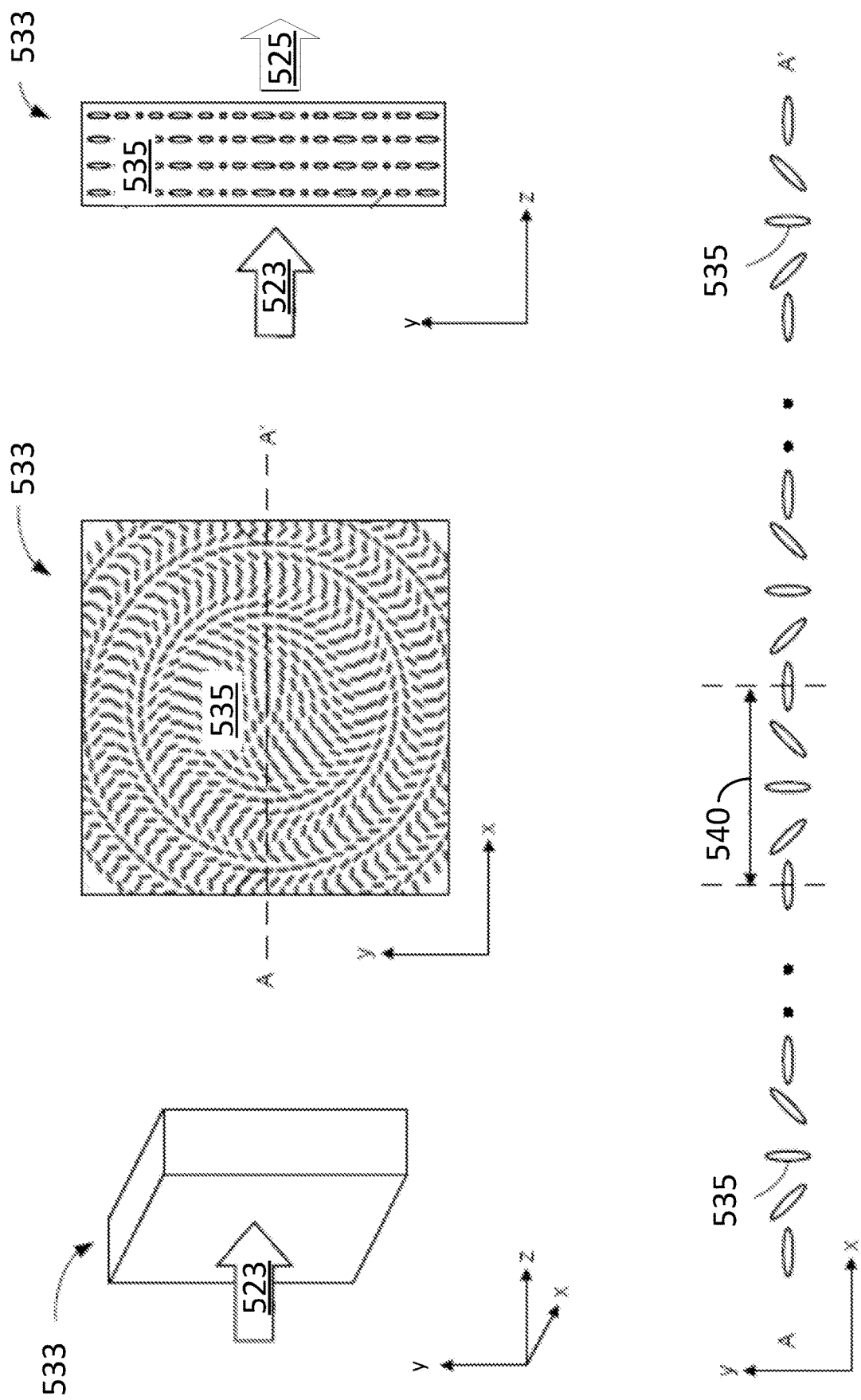
FIG. 5 illustrates a geometric phase lens for use in a varifocal assembly, according to some embodiments.

FIG. 5 illustrates a PBP lens 533 for use in a varifocal assembly, according to some embodiments. PBP lens 533 is a polarization-sensitive optical element. In some embodiments, illuminating PBP lens 533 with one circular polarization state (input beam 523) results in a positive focal length (e.g., collimated incoming light converges at the output) with an output beam 525 having the opposite circular polarization. When the polarization state of input beam 523 is switched to the orthogonal polarization, a negative focal length is obtained (e.g., collimated incoming light diverges at the output). PBP lens 533 may be a passive element. In some embodiments, adding a switchable half-wave plate enables a switch of the optical power from −1/f to +1/f to obtain a system having two focal planes. Some embodiments may include a +1/f convex glass lens or move the display to achieve a system with two planes of focus 0 and 2/f and optical power interval of 2/f.

In some embodiments, PBP lens 533 includes a thin film 535 formed on a surface of the optical element (which may have a flat cross-section). Thin film 535 may include a liquid crystal polymer having a three-dimensional pattern configured to provide, in each point of a cross section perpendicular to a propagation direction, a first phase delay for input beams 523 having a first polarization state (e.g., LCP) and a second phase delay for input beams 523 having a second polarization state (e.g., RCP). In some embodiments, the phase delay may cause an output light going through the PBP lens to converge or diverge when the input light is substantially collimated, depending on the sign and amplitude of the phase retardation provided across the XY plane of film 535. In addition to creating a converging or diverging pattern for a collimated input, the PBP lens may also switch the polarization state of the output light (e.g., incident, collimated LCP input beam 523 becomes diverging RCP output beam 525, and incident, collimated RCP input beam 523 becomes converging LCP output beam 525). A pitch 540 in the XY plane indicates a distance over which the azimuthal angle, θ, of the LC molecules in film 535 rotates by 180°. In some embodiments, pitch 540 varies as a function of distance from the center of PBP lens 533. In some embodiments, the azimuthal angle θ of liquid crystals varies in accordance with Eq. (1). In some embodiments, the pitch at the center of the lens is longest and the pitch at the edge of the lens is shortest. A shorter pitch results in a more powerful PBP lens 533 (shorter focal length), as illustrated in Eq. (1), below.

$$\theta = \left(\frac{r^2}{f} * \frac{\pi}{\lambda}\right) / 2 \qquad (1)$$

where r denotes a radial distance between the liquid crystal molecule and an optical center of PBP lens 533, f denotes a focal distance, and λ denotes a wavelength of light that PBP lens 533 is designed for.

FIG. 6 illustrates a varifocal assembly 650 to provide a variable FOV and resolution in a VR device, according to some embodiments. Varifocal assembly 650 may include multiple PBP lenses 633-1, 633-2, and 633-3 (hereinafter, collectively referred to as "PBP lenses 633") and switchable optical elements 641-1, 641-2, 641-3, and 641-4 (e.g., hereinafter, collectively referred to as "switchable waveplates 641"). A right-handed circular polarizer 631-1 filters input beam 623-1, and a left-hand circular polarizer 631-2 filters output beam 625. Hereinafter, circular polarizers 631-1 and 631-2 will be collectively referred to as "half-wave plates 631." Varifocal assembly 650 accrues a desirable optical power and bending of input beams 623-1, 623-2, 623-3, 623-4, 623-5, 623-6, 623-7, and 623-8 (hereinafter, collectively referred to as "input beams 623") according to a desirable magnification factor and resolution. In addition, the cascading of optical elements (e.g., PBP lenses 633 and switchable waveplates 641) enables, by incrementally turning switchable waveplates 641 on/off, to gradually transition from an initial configuration to a final configuration (e.g., immersive mode/focusing mode).

To reduce the optical power interval or increase the dioptric range, some embodiments include a cascade of switchable waveplates 641 and PBP lenses as shown. For example, a stack of three PBP lenses 633 (±0.25 diopters —D—, ±0.5 D, ±1 D) and switchable half-wave plates 641 may provide an accrued 3.5 D total optical power at a 0.5 D optical power interval.

FIGS. 7A-7F illustrate a segmented phase profile, liquid crystal (SPP-LC) lens 700 for use in a varifocal assembly, according to some embodiments. A layer of liquid crystal 735 may be oriented along a single direction in the plane of SPP-LC lens 700 (e.g., XY plane). Accordingly, incident light beams 723-1, 723-2, and 723-3 going through SPP-LC lens become light beams 725-1, 725-2, and 725-3 (hereinafter, collectively referred to as "light beams 723," and "light beams 725"), directed to an eyebox 751. Light beams 723 and 725 may be linearly polarized along the direction of LC 735, either by placing linear polarizers 731-1 and 731-2 (hereinafter, collectively referred to as "linear polarizers 731") before and after SPP-LC lens 700. In some embodiments, light beams 723 may have a linear polarization provided by the light emitters in a display 721.

Figure 7A:
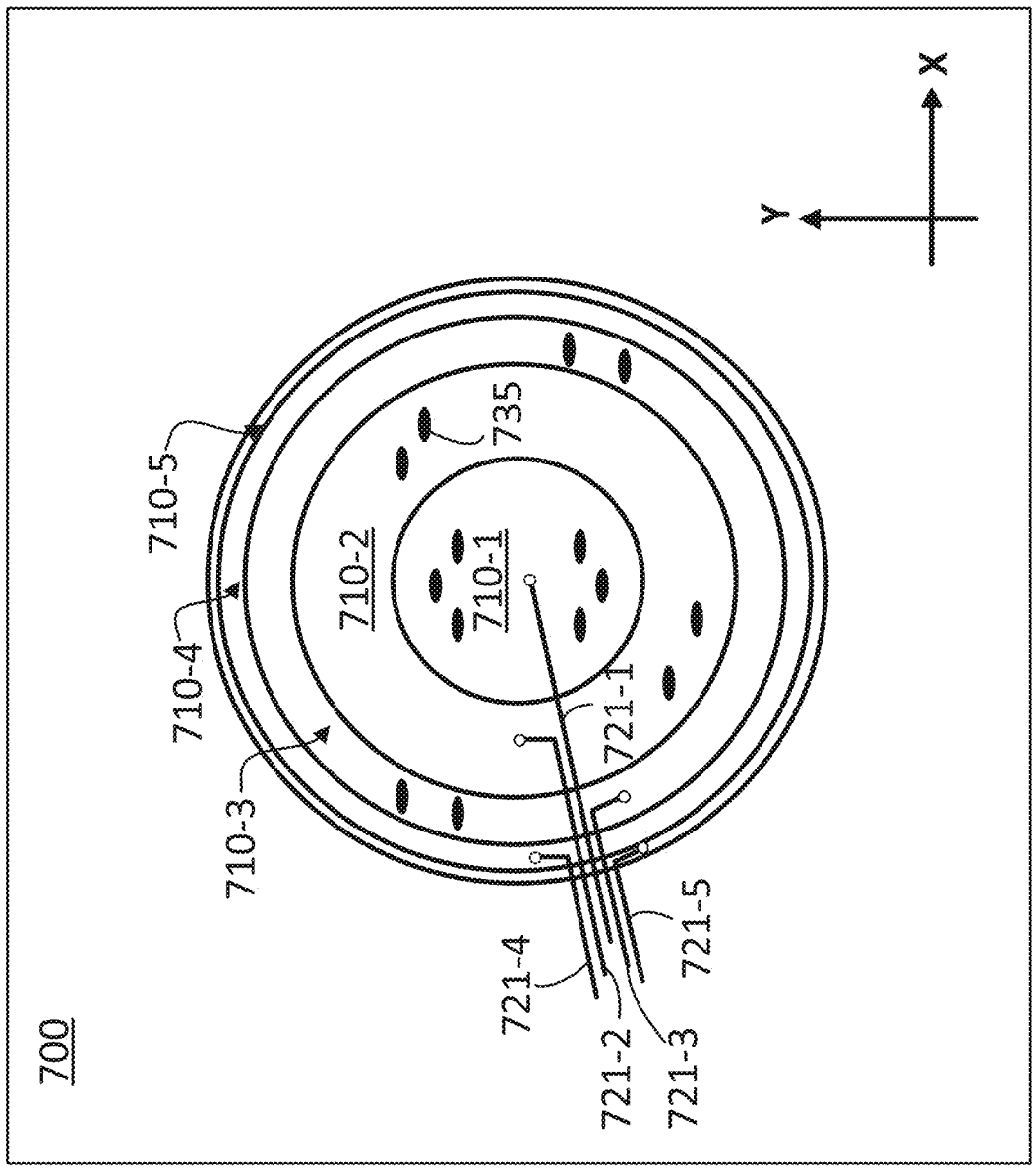

FIG. 7A illustrates a plan view (XY plane) of SPP-LC lens 700 including a plurality of concentric, ring-shaped segments 710-1, 710-2, 710-3, 710-4, and 710-5 (hereinafter, collectively referred to as "segments 710"). Each segment overlaps an electrode to activate LC 735 at a desired voltage provided by a respective one of connectors 721-1, 721-2, 721-3, 741-4, and 721-5 (hereinafter, collectively referred to as "connectors 721"). In some embodiments, segments 710 are sufficiently large (in terms of radial width within the XY plane) such that a diffraction angle is smaller than the angular resolution of the human eye. Thus, undesirable diffraction effects may be avoided for headset users.

Figure 7B:
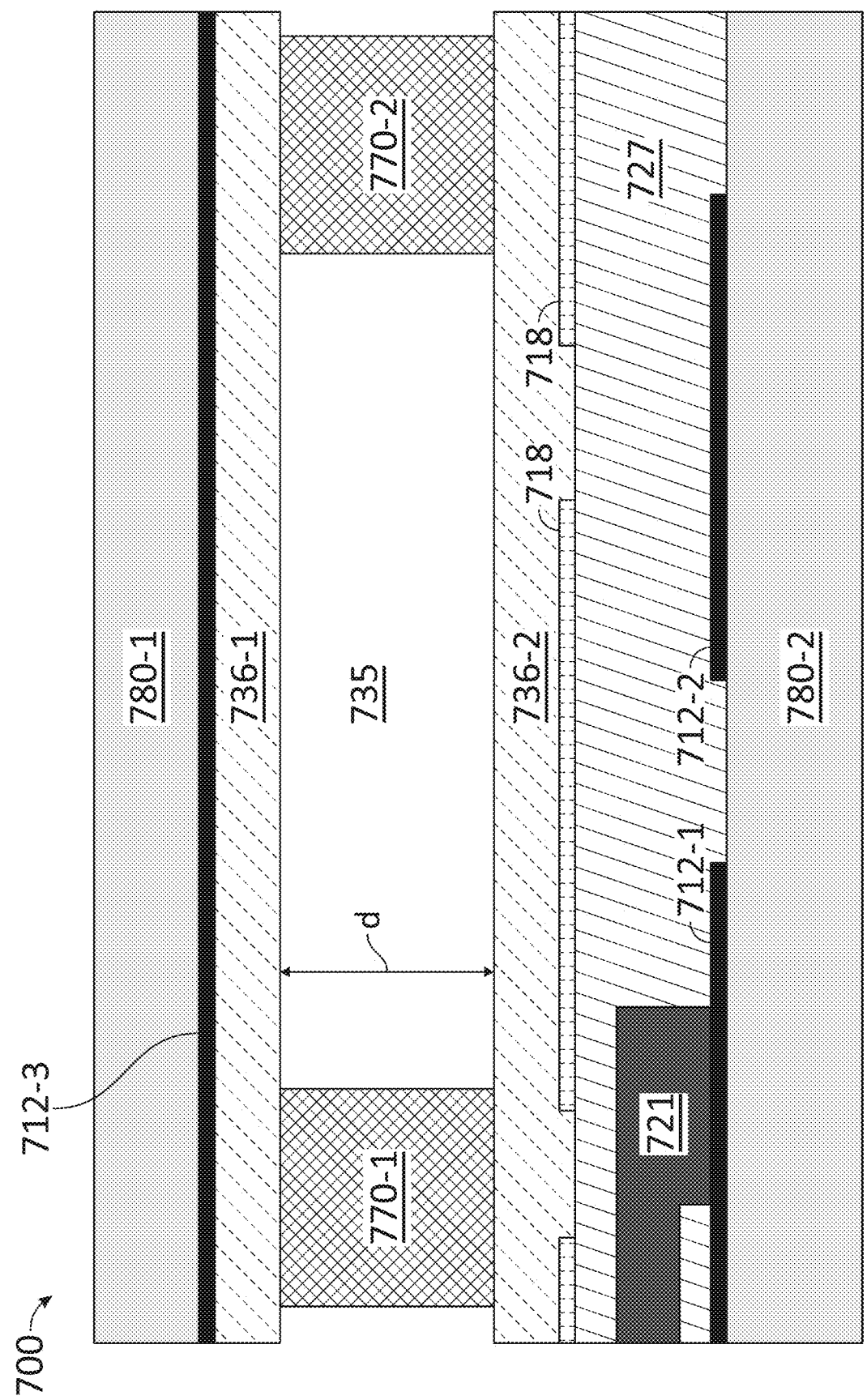

FIG. 7B is a partial cross-sectional view of SPP-LC lens 700, illustrating substrates 780-1 and 780-2 (hereinafter, collectively referred to as "substrates 780") forming an upper and lower support for LC layer 735. LC layer 735 has a thickness, d, and may be sandwiched between homogeneous polyimide (PI) alignment layers 736-1 and 736-2 (hereinafter, collectively referred to as "alignment layers 736"). Substrates 780 may be substantially transparent in the visible band (~380 nm to 750 nm). In certain embodiments, substrates 780 may also be transparent in some or all of the infrared (IR) band (~750 nm to 1 mm). In some embodiments, substrates 780 may be composed of, e.g., $SiO_2$, plastic, sapphire, and the like. LC layer 735 is disposed between ring electrodes 712-1, 712-2, and common electrode 712-3, supported by spacers 770-1 and 770-2 (hereinafter, collectively referred to as "spacers 770"). Connector 721 may include vias and conductors made of nickel, gold, aluminum, copper, or an alloy thereof, or any other conductive element reaching out to electrodes 712-1, 712-2, and/or common electrode 712-3 (hereinafter, collectively referred to as "ring electrodes 712"), overlapping each of segments 710. Ring electrodes 712 may be formed of transparent conductors such as tin oxide TiO, and the like.

In some embodiments, ring electrodes 712 may include discrete ring-shaped electrodes corresponding to the Fresnel structures in the SPP-LC lens 700, and the ring-shaped electrodes may be concentric, having similar area. With this electrode geometry, when the phase difference between adjacent first electrodes 712 is the same, a parabolic phase profile may be obtained. If the phase is proportional to the applied voltage, a linear change in the voltage across the first electrodes 712 (same difference in voltage between any two first electrodes 712) may yield a desired parabolic phase profile.

To address image degradation from scattering at the gaps between ring electrodes 712-1 and 712-2, some embodiments include a plurality of floating electrodes 718. Floating electrodes 718 may include discrete and concentric ring electrodes which are not driven by ohmic connection but are capacitively coupled to electrodes 712-1 and 712-2. Floating electrodes 718 may be configured to cover half of the area of each of neighboring electrodes 712-1 and 712-2. An insulating layer 727 (e.g., made of silicon dioxide, $SiO_2$) may be disposed between the floating electrodes 718 and the first electrodes 712. The overall thickness of SPP-LC lens 700 may be less than 1 mm (e.g., 0.8 mm, and the like).

Figure 7C:
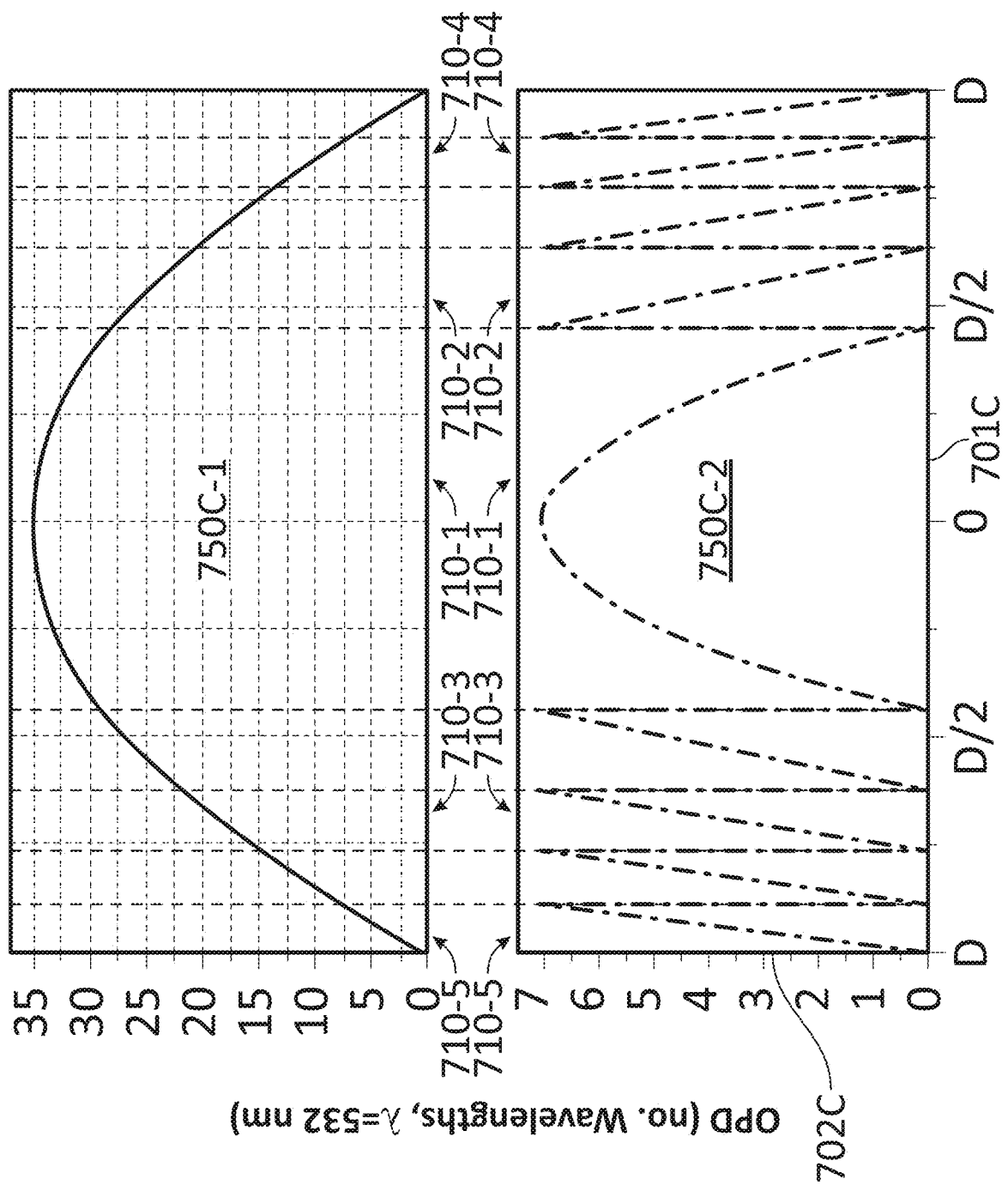

FIG. 7C illustrates optical path difference (OPD) curves 750C-1 and 750C-2 (hereinafter, collectively referred to as "OPD curves 750C") for an SPP-LC lens having a single LC layer (750C-1) and an SPP-LC lens having a segmented layer (e.g., segments 710), according to some embodiments. In OPD curves 750C, the abscissae 701C indicate a radial coordinate along the plane of the lens (XY plane), and the ordinate 702C indicate a corresponding OPD value, measured as a number of wavelengths at λ=532 nm.

The optical path difference (OPD) for a positive lens may be approximated with Maclaurin series to a parabolic profile as shown in Equation (2) and curve 750C-1, $$OPD(r) = \frac{r^2}{2f}, \quad (2)$$

where r is the radial position about the center of the lens (e.g., half of the lens aperture) and f is the focal length. For a ±0.375 Diopter (D) LC lens, where the OPD equals to 35 λ (cf. curve 750B-1), the thickness of the LC cell would be about 70 μm for LC materials with a birefringence value of 0.27. For an LC layer 735, the OPD is proportional to the cell thickness, d, and the birefringence Δn of the LC material, $$OPD = d \cdot \Delta n, \quad (3)$$

Curve 750C-1 illustrates that to achieve an OPD of 35 wavelengths across a single slab of an LC lens, a thick slab, d, is desirable. However, the response time, τ (e.g., the time an LC layer 735 requires to recover its original state) of SPP-LC lens 700 has a quadratic relation with the cell thickness d, $$\tau = \frac{\gamma \times d^2}{K_{11} \times \pi^2}, \quad (4)$$

where γ is the rotational viscosity and $K_{11}$ is the splay elastic constant of LC layer 735. Equations 2-4 show there is a tradeoff between the aperture size of SPP-LC lens 700 and response time. In general, Eqs. 2-4 show that, for a desired optical power, the thickness of LC layer 735 scales as the square of the radius if SPP-LC lens 700, $r^2$, and the latency of the device, τ, as the fourth power, $r^4$. Thus, it is desirable to design SPP-LC lens 700 with a limited aperture that allows reasonable latency, τ.

A moderate thickness, d, of LC layer 735 is also desirable to avoid director fluctuation of LC molecules near the middle of a thick LC layer (e.g., halfway between electrodes 712-1 or 712-2, and common electrode 712-3). This fluctuation may cause haziness in the image and loss of focal acuity due to phase distortion.

To reduce the thickness, d, of LC layer 735, segments 710 induce a pre-selected phase difference relative to each other. Accordingly, the thickness of LC layer 735 would be reduced 5 times and, accordingly, latency could be reduced by a factor of 25. That is, through segments 710, the optical power of SPP-LC lens 700 may be adjusted sufficiently fast to keep pace with eye accommodation (e.g., around 300 ms), such that the vergence-accommodation conflict would be resolved.

As a result of the different phase retardation in segments 710, SPP-LC lens 700 has a segmented parabolic phase profile 750C-2. In some embodiments, segments 710 are small and can result in significant diffraction, or a refractive Fresnel lens having a segmented parabolic profile 750C-2 where segments 710 are large enough so that diffraction effects are minimized. Phase resets in segments 710 enable a larger aperture and a moderate thickness, d, of SPP-LC lens 700, without compromising the response time (cf. Eq. 4), by way of connectors 721.

Figure 7D:
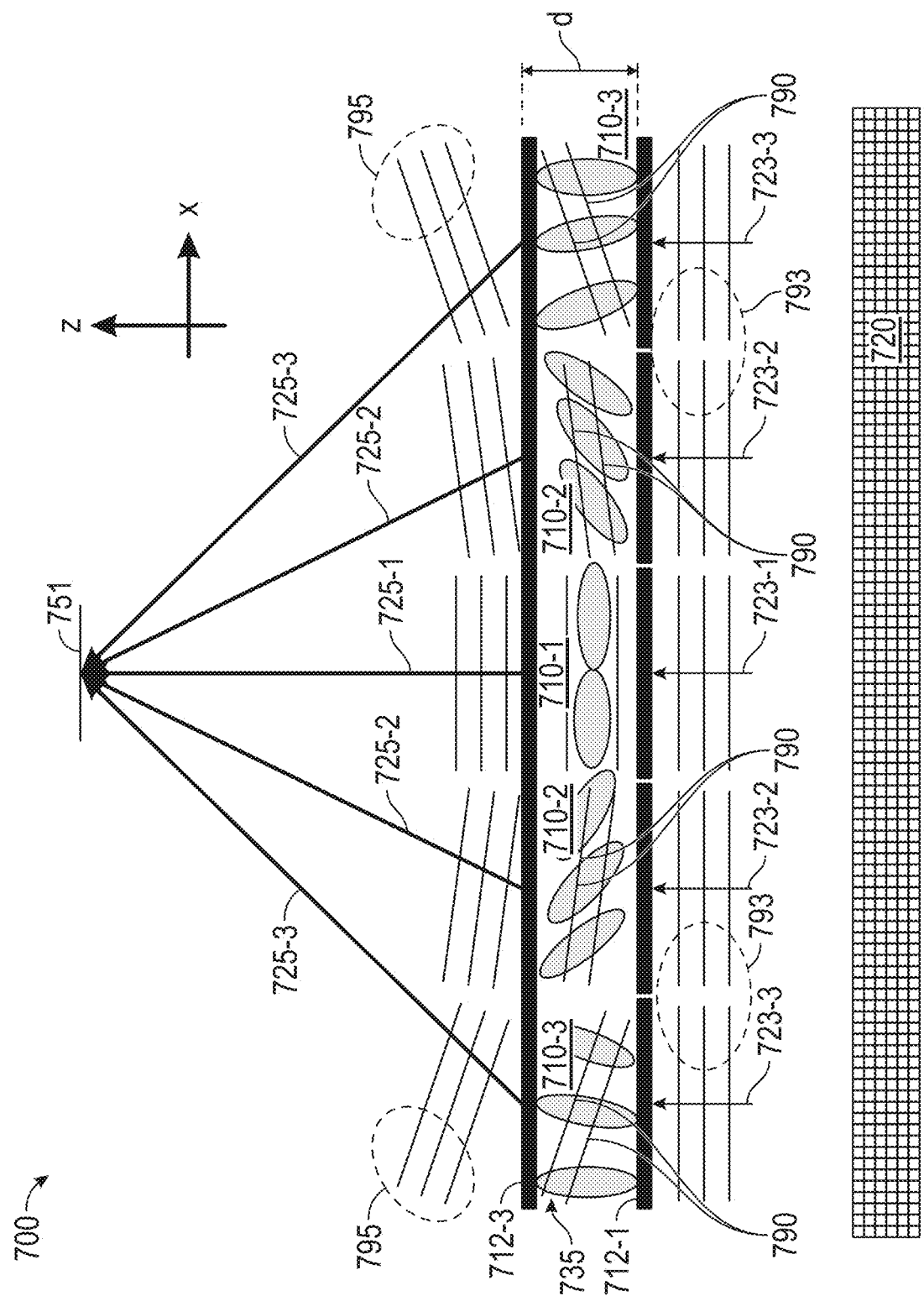

FIG. 7D is a cross sectional view of display 720 and SPP-LC lens 700 in operation, according to some embodiments. Ring electrodes 712 generate electric fields (with field lines reaching from electrodes 712-1 to common electrode 712-3) within segments 710-1, 710-2, and 710-3. LC molecules in LC layer 735 reorient to along the electric field lines (e.g., perpendicular to iso-potential lines 790). As illustrated, the phase front 793 of incoming light beams 723 (which are linearly polarized along the X-direction) see a different orientation of the LC molecules at different radial points (e.g., along the X-axis) and thus suffers different delays. The result is a corrected phase front 795 for outgoing light beams 725, converging onto eyebox 751.

Figure 7E:
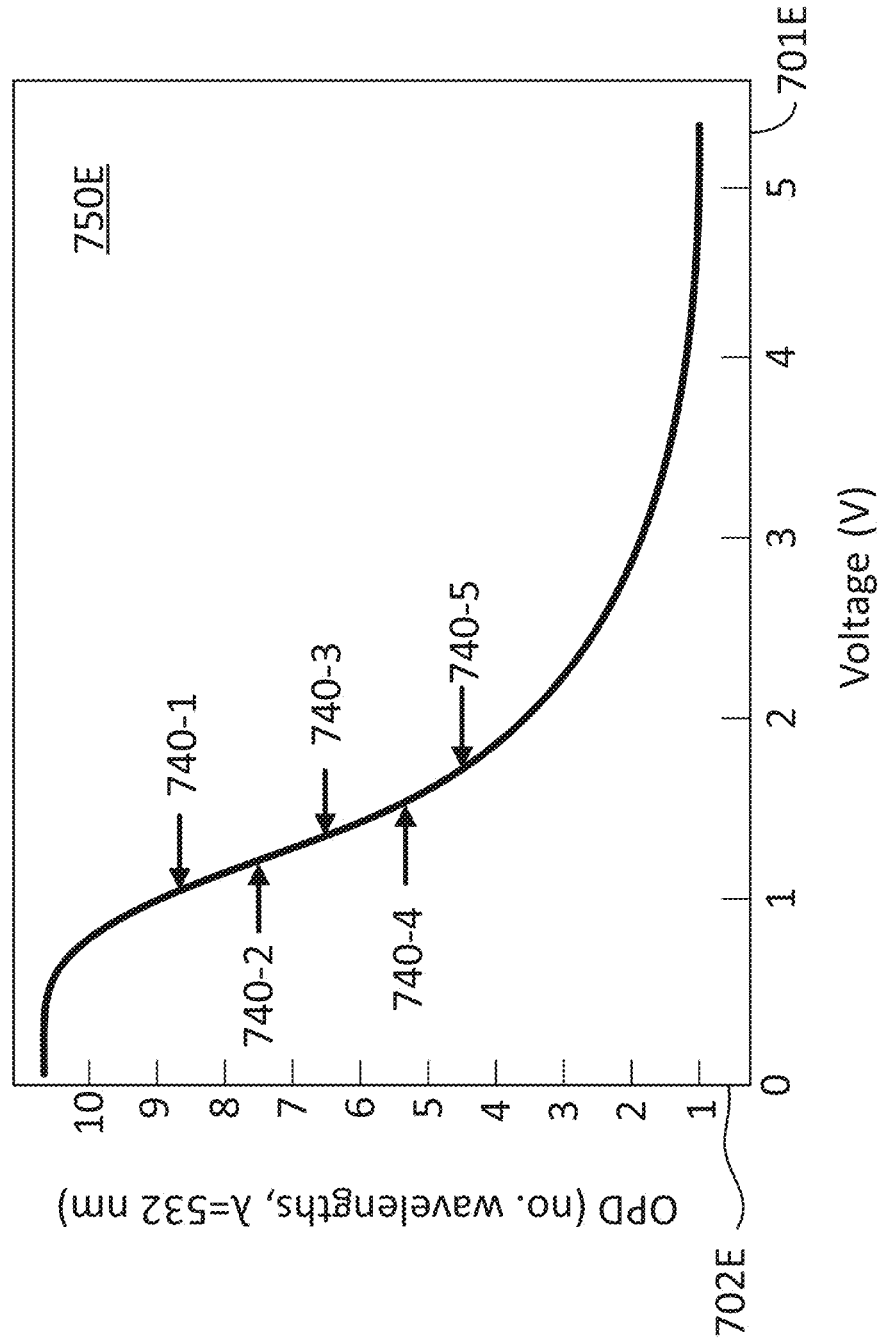

FIG. 7E illustrates a phase shift curve 750E for an LC material, according to some embodiments. Phase shift curve 750E includes voltage values in the abscissae 701E, and OPD values in the ordinates 702E (in number of wavelengths, at λ=532 nm). By adjusting a differential voltage across ring electrodes 712 corresponding to separate segments 710, via connectors 721, an OPD of at least ten wavelengths can be implemented in a single slab of LC material between 0-5 V. A linear response may be obtained between 1-2 V. Accordingly, voltage levels 740-1, 740-2, 740-3, 740-4, and 740-5 (hereinafter, collectively referred to as "voltage levels 740"), corresponding to each of ring electrodes 712, respectively, may induce an aggregated OPD of up to 35 wavelengths, or more (cf. segmented parabolic phase profile 750C-2).

Without limitation, the number of segments 710 and the voltage levels 740 applied to ring electrodes 712 is not limiting. The number of segments 710 may be determined based on specific factors such as a desired optical power, lens aperture, switching time, and image quality of the LC lens. A large number of phase steps within one wavelength of OPD (e.g., per wavelength) may be desired for accurate representation of phase profile. To configure SPP-LC lens 700 with negligible diffraction angle for near eye applications, a minimum width of segments 710 for a green wavelength of about 543.5 nm, may be larger than about 1.03 mm. For example, in some embodiments, 28 segments 710 may give rise to a 2.4 diopter lens (1 diopter equals the magnifying power of a lens having a focal length, f=1 m, D=1 m/f) within a voltage range 701E of about 5 V for LC layer 735 having a thickness, d=60 μm. In some embodiments, a configuration of three stacked SPP-LC lenses 700, each including 28 segments 710 over the same voltage range and with a thickness of 20 μm may result in the same magnification power but with a faster response and better focal acuity due to reduced director fluctuation.

In some embodiments, the voltage configuration of ring electrodes 712 may be adjusted in time patterns and voltage patterns such that the latency, τ, is further reduced. For example, in some embodiments, to increase the speed of LC layer 735, common electrode 712-3 may be placed at a high voltage (e.g., 5 or 6 V). Additionally, in some embodiments, a change in the voltage of electrodes 712 may include dropping the voltage to zero before reaching the desired voltage level 740, so as to accelerate the molecular alignment in LC layer 735.

FIG. 7F illustrates an embodiment of a varifocal assembly including linear polarizers 731 placed before and after SPP-LC lens 700, along the optical axis (Z). In some embodiments, at least one of linear polarizers 731 may not be necessary, e.g., when display 720 generates linearly polarized light beams 723. Linear polarizers 731 may reduce blur and increase focusing acuity for the image provided by SPP-LC lens 700 by correcting any scattering and dephasing effects due to director misalignment produced by the finite thickness, d, of LC layer 735.

Figure 8A:
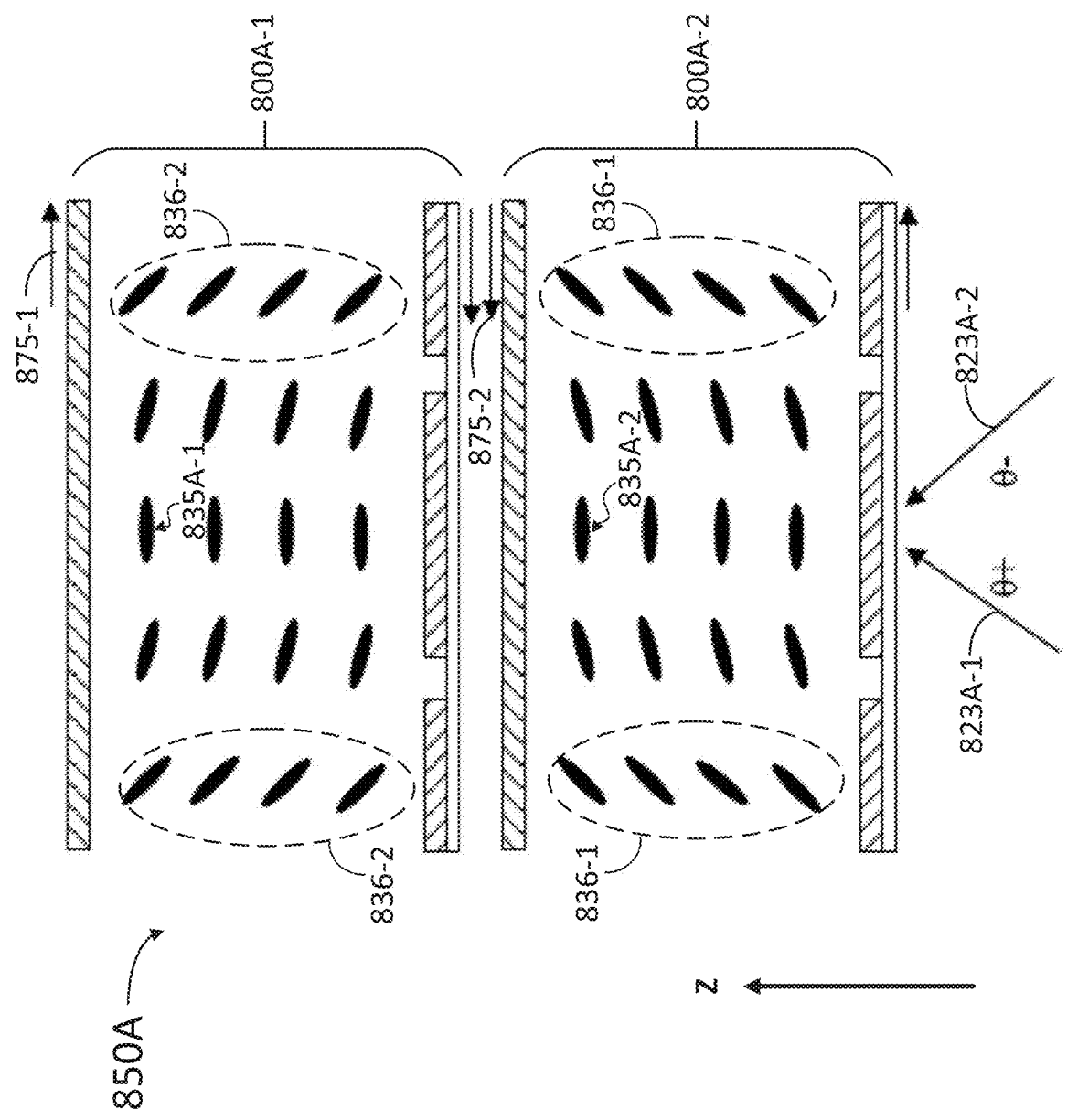
FIGS. 8A-8B illustrate varifocal assemblies including stacks of SPP-LC lenses, according to some embodiments.
Figure 8B:
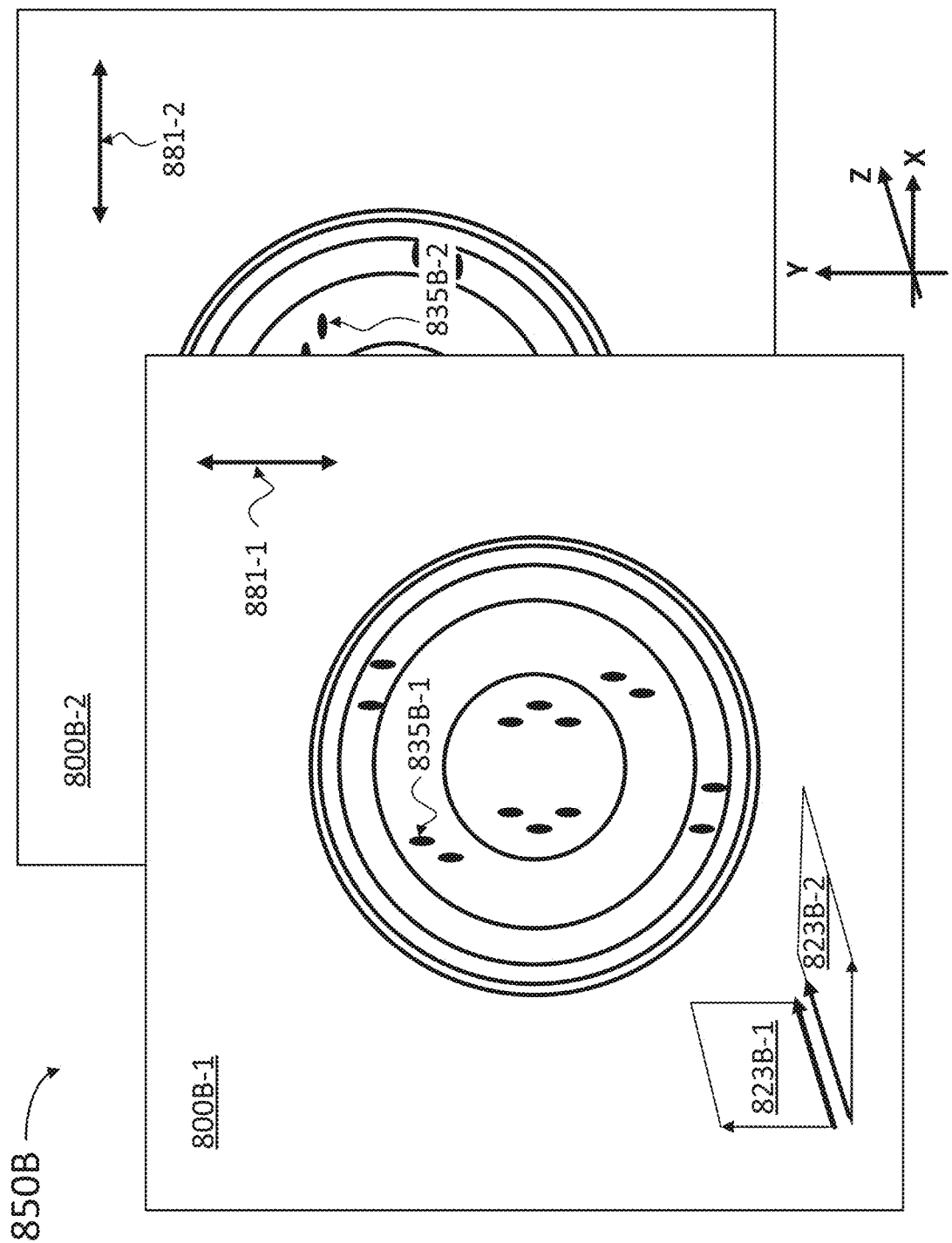

FIGS. 8A-8B illustrate varifocal assemblies 850A and 850B (hereinafter, collectively referred to as "assemblies 850") including a stack of SPP-LC lenses 800A-1 and 800A-2 (hereinafter, collectively referred to as "SPP-LC lenses 800A"), 800B-1 and 800B-2 (hereinafter, collectively referred to as "SPP-LC lenses 800B"), according to some embodiments. Hereinafter, SPP-LC lenses 800A and 800B will be collectively referred to as "SPP-LC lenses 800." Stacking SPP-LC lenses 800 may serve different purposes, such as: reduce latency, τ, increase the FOV, and/or make assemblies 850 polarization-independent.

FIG. 8A illustrates varifocal assembly 850A stacking SPP-LC lenses 800A-1 and 800A-2 along the optical axis, Z, to reduce latency, τ, such that given a same tunable optical power range, the thickness of each SPP-LC lens may be reduced and, accordingly, the response of SPP-LC lenses 800A may be reduced. Without loss of generality, varifocal assembly 850A may include any number of SPP-LC lenses 800A, optically coupled to form a stack. Provided that each SPP-LC lens 800A has multiple segments (e.g., 'n' segments 710), the thickness of the LC cell may be reduced up to 2n times (e.g., ten, in the case of stacking two SPP-LC lenses 700). Accordingly, the response speed may be improved by a factor of $4n^2$ (cf. Eq. 4).

In addition to stacking SPP-LC lenses 800A to reduce latency, τ, some embodiments may have opposite rubbing directions 875-1 and 875-2 or alignment directions (hereinafter, collectively referred to as "alignment directions 875") on the corresponding LC layers 835A-1 and 835A-2 (hereinafter, collectively referred to as "LC layers 835A"). This increases the FOV of the stack, as incoming light beams 823A-1 and 823A-2 (hereinafter, collectively referred to as "incoming beams 823A") may have a wider angular spread while undergoing a similar phase retardation through SPP-LC lenses 800A. For example, incoming beam 823A-1 comes at an incidence angle θ+ that makes LC molecules 836-1 have a lower retardation effect than for incoming beam 823A-2. The reverse occurs for incoming beam 823A-2 and LC molecules 836-2. By stacking SPP-LC lenses 800A with opposite alignment directions 875, the overall effect is a homogenous phase retardation for incoming beams 823, thereby increasing the FOV to 2θ.

FIG. 8B Illustrates SPP-LC lenses 800B in a polarization-insensitive configuration. LC layers 835B-1 and 835B-2 are oriented along orthogonal directions 881-1 and 881-2 (hereinafter, collectively referred to as "LC layers 835B," and "polarization directions 881") in the XY plane, thus combining an ordinary and extraordinary index of refraction for incoming beams 823B-1 and 823B-2 (hereinafter, collectively referred to as "incoming beams 823B").

In some embodiments, LC layers 835B may include a cholesteric LC with a pitch in the range of the wavelength incoming beams 823B. Therefore, when no voltage is applied, incoming beams 823B will experience an average refractive index ($n_o+n_e/2$) regardless of their polarization state.

Figure 9A:
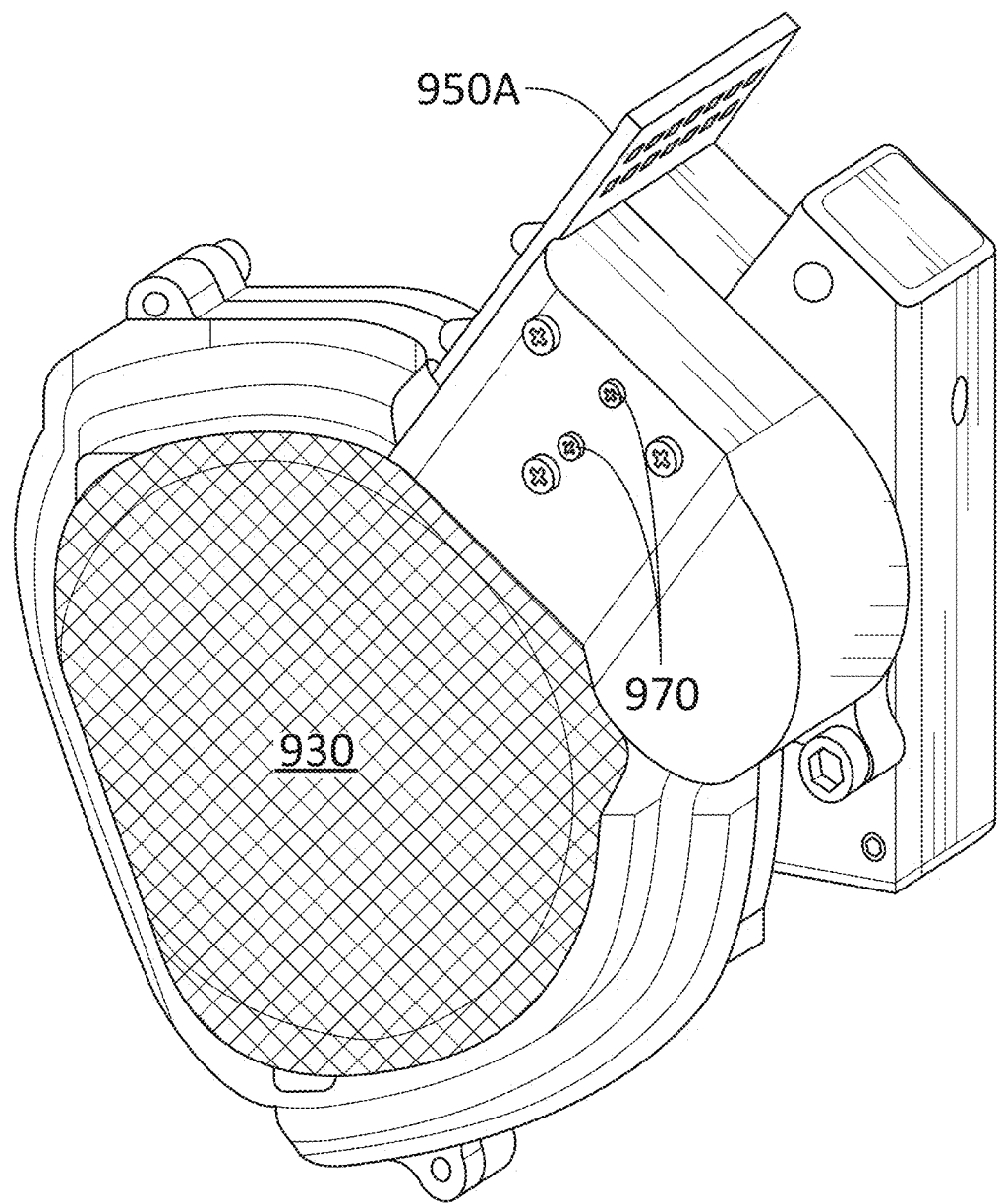
FIGS. 9A-9C illustrate varifocal assemblies for adjusting a field of view and resolution in a headset, according to different electro-mechanical embodiments.
Figure 9B:
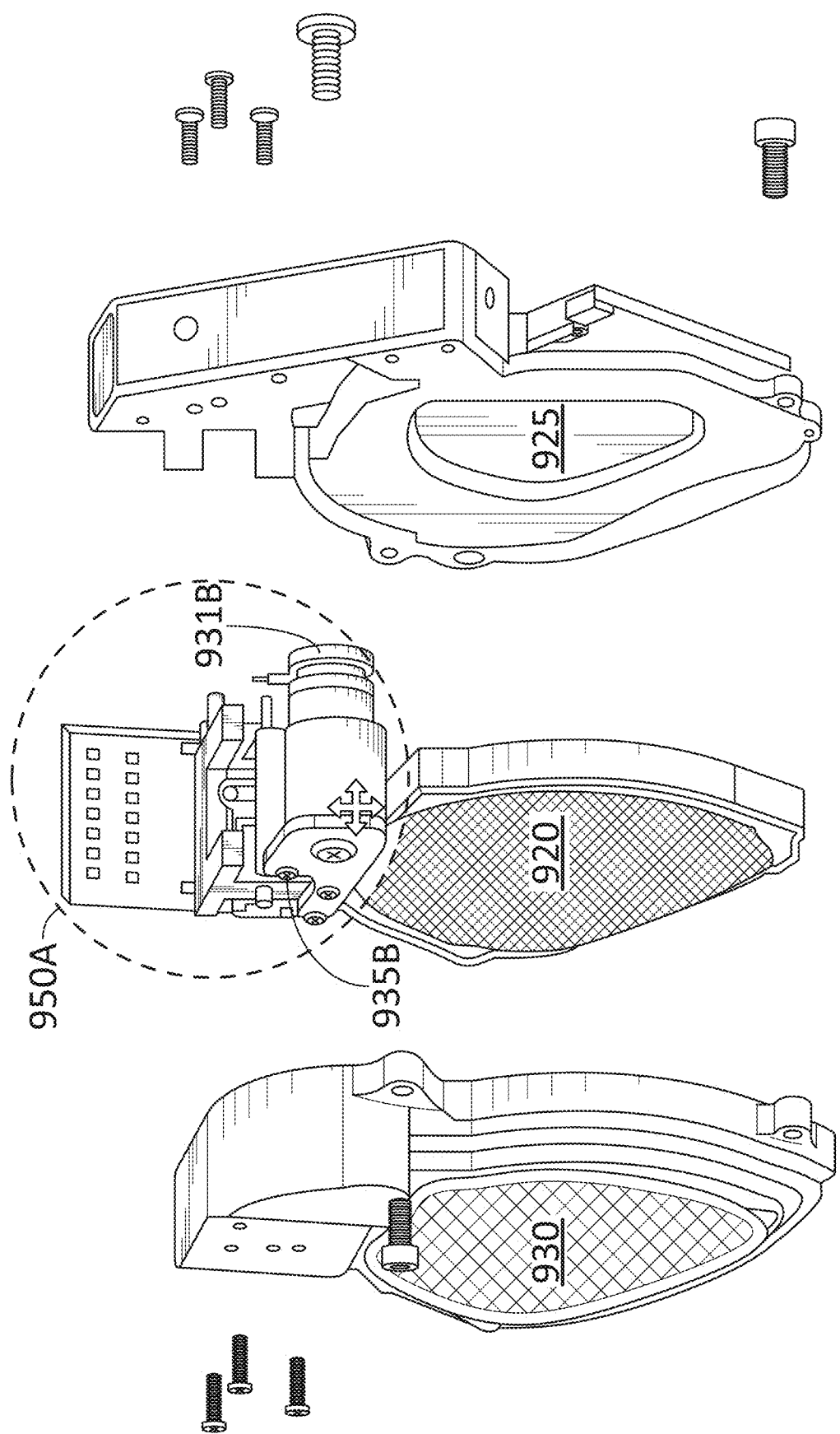
Figure 9C:
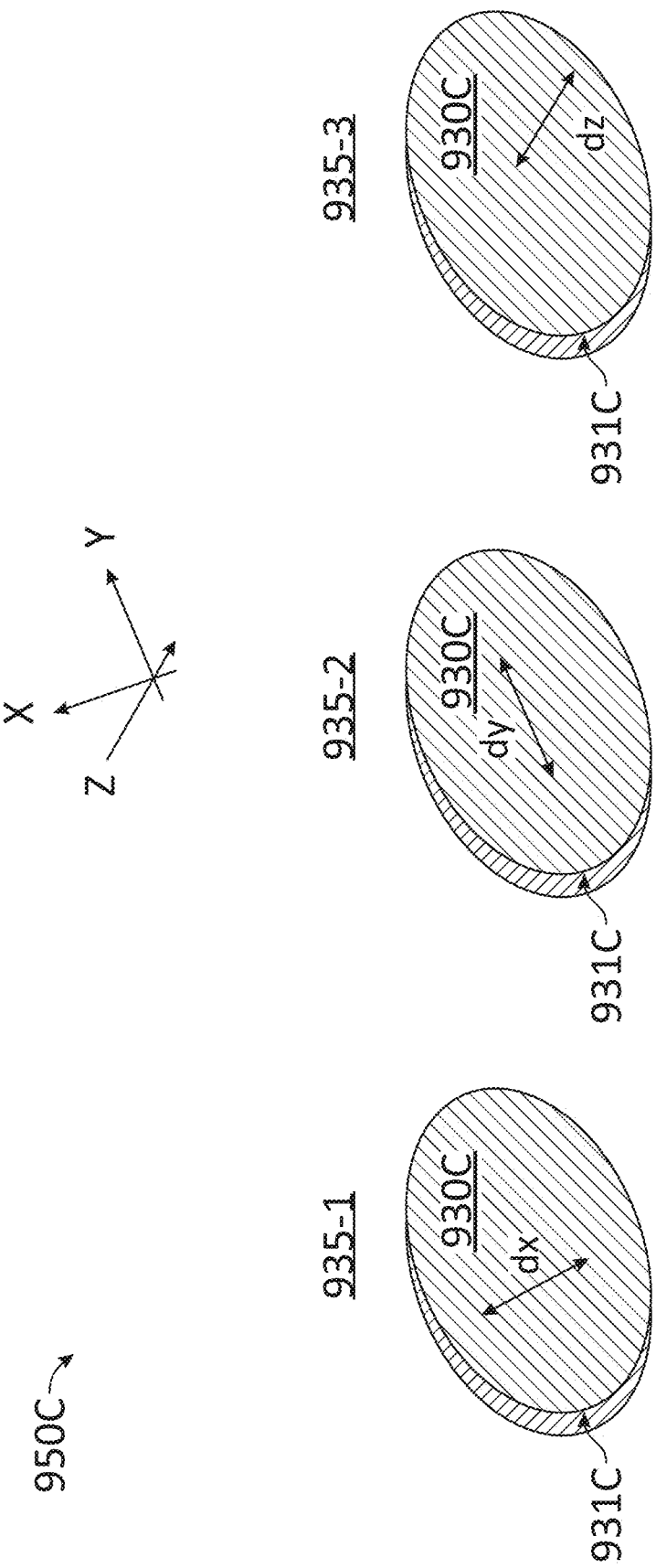

FIGS. 9A-9C illustrate varifocal assemblies 950A and 950C (hereinafter, collectively referred to as "varifocal assemblies 950") for adjusting a field of view and resolution in a headset, according to different electro-mechanical embodiments. Without loss of generality, any one of varifocal assemblies 950 may be stacked with one another along the optical axis of the headset to increase or enhance the magnification range of the system.

FIGS. 9A-9B illustrate varifocal assembly 950A, which includes a motor 931B configured to move an actuator 935B against a headset frame 925. Actuator 935B may be a screw which, upon rotation, effects a relative displacement between a lens 930A, and a display 920, in a headset. The displacement alters the working distance between display 970 and lens 930, thereby changing the magnification factor of the image projected to the user. In some embodiments, motor 931B may be activated by the user via a switch or a touch button placed on the frame of the headset. In some embodiments, motor 931B may be activated by an eye-tracking device 970 that determines an object of interest for the user, within display 920 (e.g., via pupil detection gaze and vergence detection and latency).

FIG. 9C illustrates varifocal assembly 950C, wherein a lens 930C includes an electrically deformable, transparent piezo electric material. An electrode 931C provides an electric impulse that deforms lens 930C in any one of three different, orthogonal deformation directions 935-1 (X), 935-2 (Y), and 935-3 (Z). Upon deformation, lens 950C changes its optical properties, such as focal length, radius of curvature, and ultimately magnification power. More specifically, a positive/negative deformation along the optical axis of lens 950C may switch the lens from a positive, focusing lens, into a negative, defocusing lens. Piezo-electric varifocal assembly 930C may be activated via direct user input, or automatically in response to an eye-tracking signal (see above).

Figure 10:
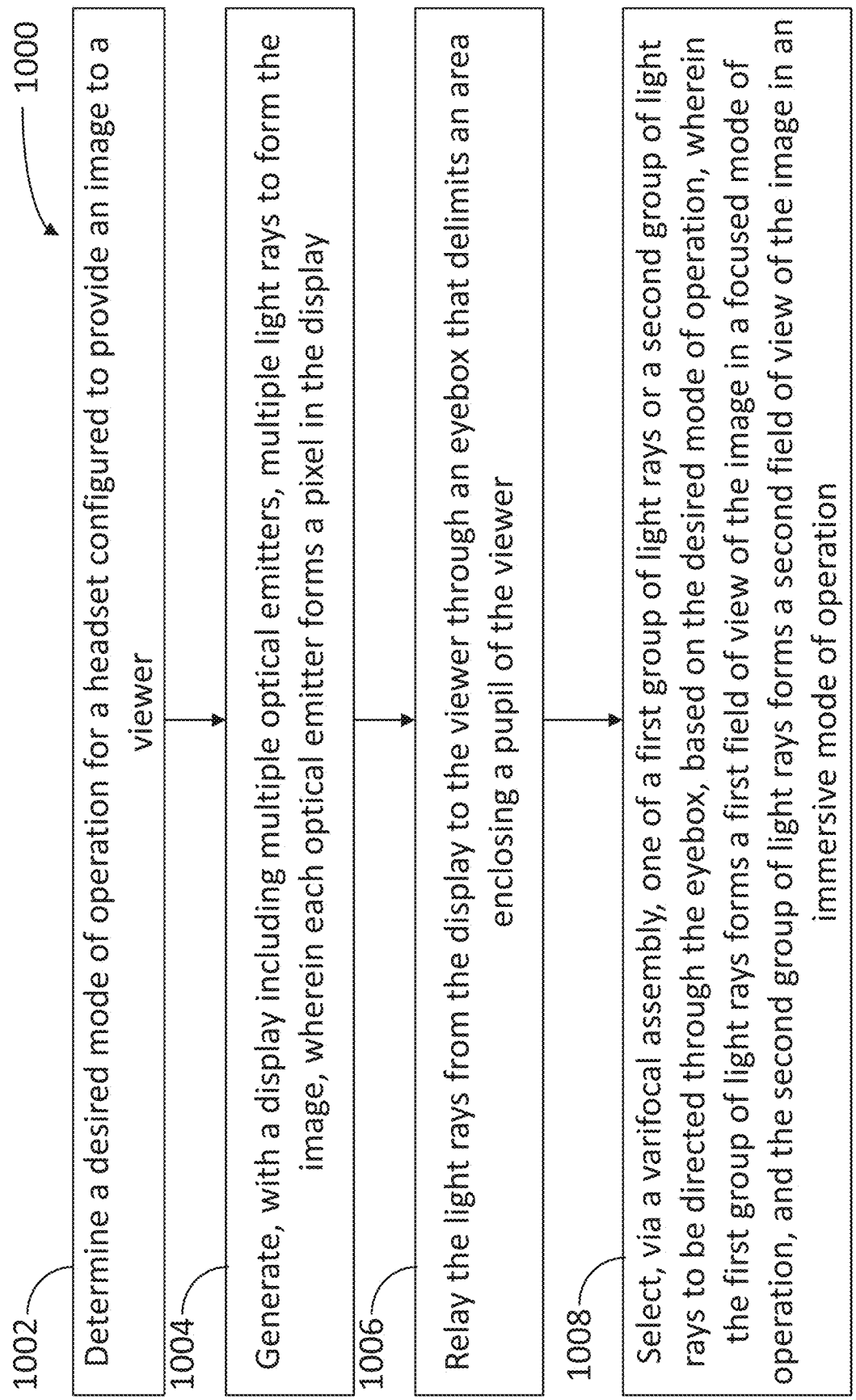
FIG. 10 is a flow chart illustrating steps in a method for adjusting a field of view and resolution in a headset, according to some embodiments.

FIG. 10 is a flow chart illustrating steps in a method 1000 for adjusting a field of view and resolution in a display for a virtual reality headset based on a usage mode of the device, according to some embodiments. The virtual reality headset may include an optical element and a varifocal assembly, as disclosed herein. A controller may activate at least some of the optical element and components in the varifocal assembly via software commands stored in a memory and executed by a processor. The optical elements may be configured to select light in a given state of polarization, or convert light from one state of polarization to a different (e.g., orthogonal) state of polarization. A method consistent with the present disclosure may include at least one of the steps in method 1000, or two or more steps in method 1000 performed in a different order, simultaneously, quasi-simultaneously, or overlapping in time.

Step 1002 includes determining a desired mode of operation for a headset configured to provide an image to a viewer. In some embodiments, step 1002 includes determining between at least one of a focused mode of operation and an immersive mode of operation. In some embodiments, step 1002 includes tacking the pupil of the viewer and identifying a vergence plane of the viewer on the image. In some embodiments, step 1002 includes receiving an input from the viewer, the input including a selection of the desired mode of operation. In some embodiments, step 1002 includes predicting the desired mode of operation for the headset based on a location of the pupil of the viewer and an interaction between the viewer and an application running in the headset.

Step 1004 includes generating, with a display including multiple optical emitters, multiple light rays forming the image, wherein each optical emitter forms a pixel in the display.

Step 1006 includes relaying the light rays from the display to the viewer through an eyebox that delimits an area enclosing a pupil of the viewer.

Step 1008 includes selecting, via a varifocal assembly, one of a first group of light rays or a second group of light rays to be directed through the eyebox, based on the desired mode of operation, wherein the first group of light rays forms a first field of view of the image in a focused mode of operation, and the second group of light rays forms a second field of view of the image in an immersive mode of operation. In some embodiments, step 1008 includes switching a polarization state of one of the first group of light rays or the second group of light rays between a left-handed circular polarization and a right-handed circular polarization. In some embodiments, step 1008 includes blocking light rays having a selected polarization state from reaching the eyebox. In some embodiments, step 1008 includes adjusting a resolution of the image in the display based on the desired mode of operation for a headset. In some embodiments, step 1008 includes increasing a resolution of the image in the display when the desired mode of operation is a focused mode of operation that increases a magnification of the image for the viewer. In some embodiments, step 1008 includes generating an image based on the desired mode of operation for a headset configured to provide an image to a viewer.

Hardware Overview

Figure 11:
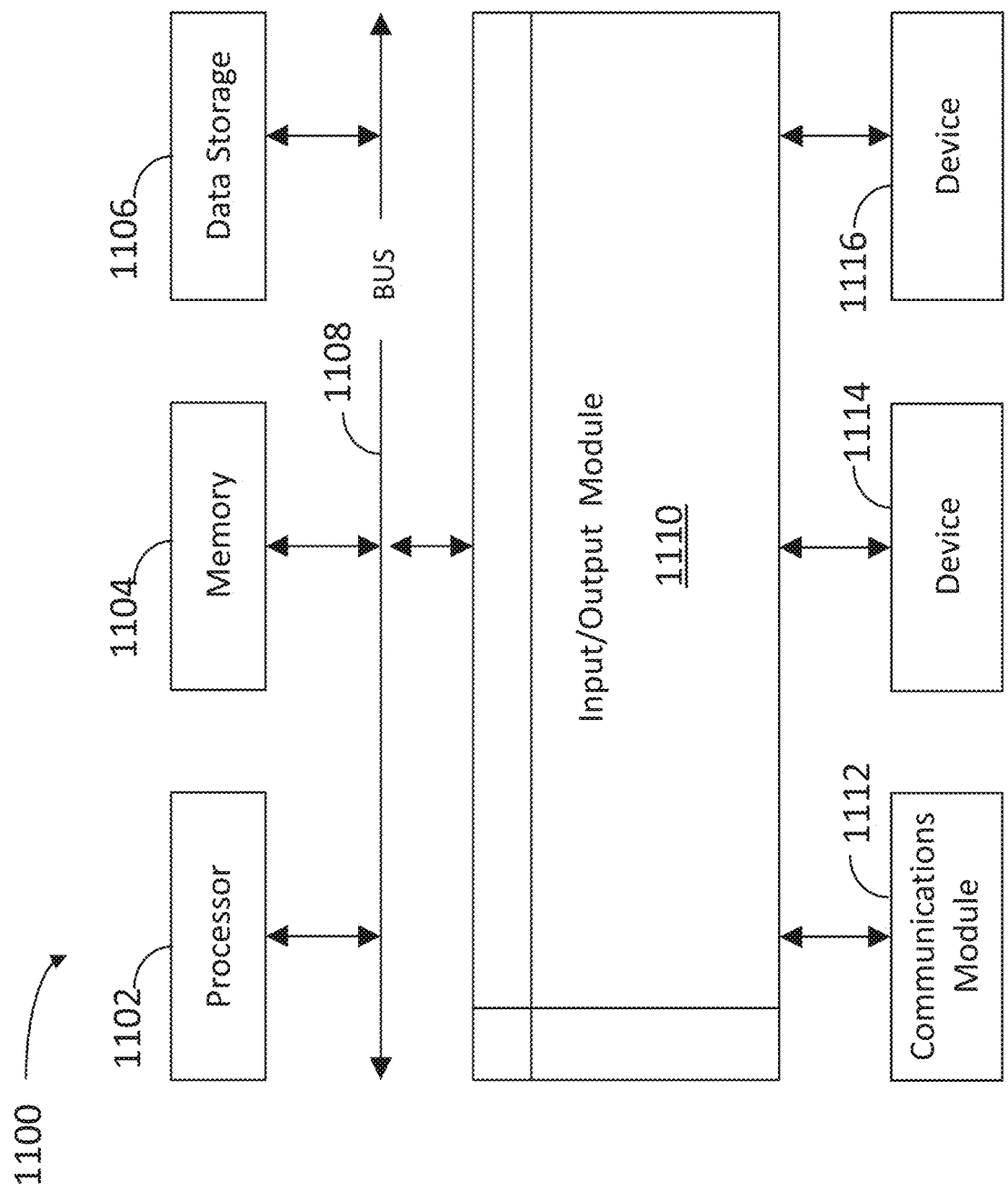
FIG. 11 is a block diagram illustrating devices and systems for virtual reality applications with variable field of view and resolution in a headset, according to some embodiments.

FIG. 11 is a block diagram illustrating an exemplary computer system 1100 with which headset 100 of FIGS. 1A-B, and method 1000 can be implemented. In certain aspects, computer system 1100 may be implemented using hardware or a combination of software and hardware, either in a dedicated server, or integrated into another entity, or distributed across multiple entities. Computer system 1100 may include a desktop computer, a laptop computer, a tablet, a phablet, a smartphone, a feature phone, a server computer, or otherwise. A server computer may be located remotely in a data center or be stored locally.

Computer system 1100 includes a bus 1108 or other communication mechanism for communicating information, and a processor 1102 (e.g., processor 112) coupled with bus 1108 for processing information. By way of example, the computer system 1100 may be implemented with one or more processors 1102. Processor 1102 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1100 can include, in addition to hardware, code that creates an execution environment for the computer program in question, e.g., code that constitutes processor firmware, a protocol stack, a database management system, an operating system, or a combination of one or more of them stored in an included memory 1104 (e.g., memory 122), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1108 for storing information and instructions to be executed by processor 1102. The processor 1102 and the memory 1104 can be supplemented by, or incorporated in, special purpose logic circuitry.

The instructions may be stored in the memory 1104 and implemented in one or more computer program products, e.g., one or more modules of computer program instructions encoded on a computer-readable medium for execution by, or to control the operation of, the computer system 1100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1100 further includes a data storage device 1106 such as a magnetic disk or optical disk, coupled with bus 1108 for storing information and instructions. Computer system 1100 may be coupled via input/output module 1110 to various devices. Input/output module 1110 can be any input/output module. Exemplary input/output modules 1110 include data ports such as USB ports. The input/output module 1110 is configured to connect to a communications module 1112. Exemplary communications modules 1112 include networking interface cards, such as Ethernet cards and modems. In certain aspects, input/output module 1110 is configured to connect to a plurality of devices, such as an input device 1114 and/or an output device 1116. Exemplary input devices 1114 include a keyboard and a pointing device, e.g., a mouse or a trackball, by which a consumer can provide input to the computer system 1100. Other kinds of input devices 1114 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1116 include display devices, such as an LCD (liquid crystal display) monitor, for displaying information to the consumer.

According to one aspect of the present disclosure, HMD device 100 can be implemented, at least partially, using a computer system 1100 in response to processor 1102 executing one or more sequences of one or more instructions contained in memory 1104. Such instructions may be read into memory 1104 from another machine-readable medium, such as data storage device 1106. Execution of the sequences of instructions contained in main memory 1104 causes processor 1102 to perform the process steps described herein. One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1100 can include clients and servers. A client and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1102 for execution. Such a medium may take many forms, including, but not limited to, non-volatile media, volatile media, and transmission media. Non-volatile media include, for example, optical or magnetic disks, such as data storage device 1106. Volatile media include dynamic memory, such as memory 1104. Transmission media include coaxial cables, copper wire, and fiber optics, including the wires forming bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device, comprising:
   a display including multiple pixels, each pixel having an optical emitter to provide at least one light beam from an image;

an optical element configured to relay multiple light beams from the display to a viewer through an eye box, the eye box limiting an area that includes a pupil of the viewer;

a varifocal assembly configured to direct, through the eye box, one of a first group of light beams having a first polarization state and one of a second group of light beams having a second polarization state, according to a desired mode of operation of the device, wherein the first group of light beams forms a first field of view of the image in a focused mode of operation of the device, and the second group of light beams forms a second field of view of the image in an immersive mode of operation of the device, wherein the varifocal assembly includes a thin film formed on a surface of the optical element, the thin film including a liquid crystal polymer having a three-dimensional pattern configured to provide, in each point of a cross section perpendicular to a propagation direction, a first phase delay for the first group of light beams and a second phase delay for the second group of light beams; and a planar waveguide configured to relay the at least one light beam through the eye box.

2. The device of claim 1, wherein the varifocal assembly is configured to convert light beams having the first polarization state into light beams having the second polarization state when de-activated, and to transmit light beams without changing its polarization state when activated.

3. The device of claim 1, wherein the first group of light beams has a first optical divergence through the eye box and the second group of light beams has a second optical divergence through the eye box, wherein the second optical divergence is smaller than the first optical divergence.

4. The device of claim 1, wherein the varifocal assembly is configured to block at least one of the first group of light beams or the second group of light beams according to the desired mode of operation of the device.

5. The device of claim 1, wherein the first polarization state is orthogonal to the second polarization state.

6. The device of claim 1, wherein the display is configured to adjust a resolution of the image based on the desired mode of operation of the device.

7. The device of claim 1, further comprising:
a first polarizer to select one of the first group of light beams or the second group of light beams before the varifocal assembly;
a second polarizer; and
a switchable retarder disposed between the first polarizer and the second polarizer.

8. The device of claim 1, wherein the optical element includes one or more of a Pancharatnam-berry-phase lens, a polarization sensitive hologram lens, and a liquid crystal optical phase array.

9. A method, comprising:
determining a desired mode of operation for a headset configured to provide an image to a viewer;
generating, with a display including multiple optical emitters, wherein each optical emitter forms a pixel in the display, multiple light beams forming the image;
relaying, with an optical element, the light beams from the display to the viewer through an eye box that delimits an area enclosing a pupil of the viewer; and
selecting, via a varifocal assembly, one of a first group of light beams or a second group of light beams to be directed through the eye box, based on the desired mode of operation, wherein the first group of light beams forms a first field of view of the image in a focused mode of operation, and the second group of light beams forms a second field of view of the image in an immersive mode of operation, wherein selecting a first group of light beams or a second group of light beams comprises providing, in each point of a cross section perpendicular to a propagation direction, a first phase delay for the first group of light beams and a second phase delay for the second group of light beams in a thin film formed on a surface of the optical element, the thin film having a liquid crystal polymer formed into a three-dimensional pattern.

10. The method of claim 9, wherein determining a desired mode of operation for a headset comprises determining between at least one of a focused mode of operation and an immersive mode of operation.

11. The method of claim 9, wherein determining a desired mode of operation for a headset comprises tracking the pupil of the viewer and identifying a vergence plane of the viewer on the image.

12. The method of claim 9, wherein determining a desired mode of operation for a headset comprises receiving an input from the viewer, the input including a selection of the desired mode of operation.

13. The method of claim 9, wherein determining a desired mode of operation for a headset comprises predicting the desired mode of operation for the headset based on a location of the pupil of the viewer and an interaction between the viewer and an application running in the headset.

14. The method of claim 9, wherein selecting, via a varifocal assembly, one of a first group of light beams or a second group of light beams to be directed through the eye box comprises switching a polarization state of one of the first group of light beams or the second group of light beams between a left-handed circular polarization and a right-handed circular polarization.

15. The method of claim 9, wherein selecting, via a varifocal assembly, one of a first group of light beams or a second group of light beams to be directed through the eye box comprises blocking light beams having a selected polarization state from reaching the eye box.

16. The method of claim 9, further comprising adjusting a resolution of the image in the display based on the desired mode of operation for a headset.

17. The method of claim 9, further comprising increasing a resolution of the image in the display when the desired mode of operation is a focused mode of operation that increases a magnification of the image for the viewer.

18. The method of claim 9, further comprising generating an image based on the desired mode of operation for a headset configured to provide an image to a viewer.

* * * * *